United States Patent
Pope et al.

(10) Patent No.: US 9,633,247 B2
(45) Date of Patent: Apr. 25, 2017

(54) ELECTRONIC DEVICE WITH SHARED NEAR FIELD COMMUNICATIONS AND SENSOR STRUCTURES

(75) Inventors: Benjamin J. Pope, Sunnyvale, CA (US); Daniel W. Jarvis, Sunnyvale, CA (US); Nicholas G. L. Merz, San Francisco, CA (US); Scott A. Myers, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 13/409,615

(22) Filed: Mar. 1, 2012

(65) Prior Publication Data

US 2013/0231046 A1 Sep. 5, 2013

(51) Int. Cl.
*H04B 7/00* (2006.01)
*G06K 9/00* (2006.01)
*H04B 5/00* (2006.01)

(52) U.S. Cl.
CPC ....... *G06K 9/00013* (2013.01); *H04B 5/0012* (2013.01); *H04B 5/0075* (2013.01)

(58) Field of Classification Search
CPC ......... G06K 9/00013; H04B 5/00; H04B 7/00
USPC ....................................... 455/41.1
See application file for complete search history.

(56) References Cited

U.S. PATENT DOCUMENTS

| | | |
|---|---|---|
| 7,146,191 B2 | 12/2006 | Kerner et al. |
| 8,018,913 B2 | 9/2011 | Rofougaran |
| 8,117,445 B2 | 2/2012 | Werner et al. |
| 2008/0122792 A1 | 5/2008 | Izadi et al. |
| 2008/0155257 A1* | 6/2008 | Werner et al. ............... 713/168 |

(Continued)

FOREIGN PATENT DOCUMENTS

| | | |
|---|---|---|
| EP | 2107771 | 7/2009 |
| JP | 2009253478 | 10/2009 |

(Continued)

OTHER PUBLICATIONS

Yuichi Kado et al., "AC Electric Field 1-25 Communication for Human-Area Networking", IEICE Transactions on Electronics, Institute of Electronics, Tokyo, JP, vol. E93C, No. 3, Mar. 2010, pp. 234-243.

(Continued)

*Primary Examiner* — Xin Jia
(74) *Attorney, Agent, or Firm* — Treyz Law Group, P.C.; G. Victor Treyz; Zachary D. Hadd

(57) ABSTRACT

An electronic device may have electrical components such as sensors. A sensor may have sensor circuitry that gathers sensor data using a conductive structure. The sensor may be a touch sensor that uses the conductive structure to form a capacitive touch sensor electrode or may be a fingerprint sensor that uses the conductive structure with a fingerprint electrode array to handle fingerprint sensor signals. Near field communications circuitry may be included in an electronic device. When operated in a sensor mode, the sensor circuitry may use the conductive structure to gather a fingerprint or other sensor data. When operated in near field communications mode, the near field communications circuitry can use the conductive structure to transmit and receive capacitively coupled or inductively coupled near field communications signals. A fingerprint sensor may have optical structures that communicate with external equipment.

30 Claims, 22 Drawing Sheets

(56) References Cited

U.S. PATENT DOCUMENTS

| | | | |
|---|---|---|---|
| 2009/0083847 | A1 | 3/2009 | Fadell et al. |
| 2009/0143104 | A1 | 6/2009 | Loh et al. |
| 2009/0251339 | A1 | 10/2009 | Naruse |
| 2010/0009658 | A1* | 1/2010 | Wu et al. ............... 455/411 |
| 2010/0069940 | A1* | 3/2010 | Miller et al. ............ 606/169 |
| 2010/0267421 | A1 | 10/2010 | Rofougaran |
| 2011/0059692 | A1 | 3/2011 | Hyoung et al. |
| 2011/0061948 | A1 | 3/2011 | Krah et al. |
| 2011/0139517 | A1* | 6/2011 | Mizushima ............ 178/18.06 |
| 2011/0240748 | A1* | 10/2011 | Doughty et al. ......... 235/492 |
| 2011/0257491 | A1* | 10/2011 | Robertson et al. ....... 600/302 |
| 2011/0304583 | A1 | 12/2011 | Kruglick |
| 2012/0162128 | A1* | 6/2012 | Hyoung et al. .......... 345/174 |
| 2013/0196596 | A1* | 8/2013 | Parekh et al. ........... 455/41.1 |
| 2013/0211265 | A1* | 8/2013 | Bedingham et al. ..... 600/483 |

FOREIGN PATENT DOCUMENTS

| | | |
|---|---|---|
| JP | 2009267860 | 11/2009 |
| JP | 2011253550 | 12/2011 |
| KR | 10-2005-0047921 | 5/2005 |
| KR | 10-2012-0013907 | 2/2012 |
| WO | 2010/024137 | 3/2010 |
| WO | 2011155939 | 12/2011 |

OTHER PUBLICATIONS

Standard ECMA-401: Close Capacitive Coupling Communication Physical Layer (CCCC PHY), ECMA, Dec. 2011 (48 pages) [Retrieved on Feb. 22, 2012]. Retrieved from the Internet: <URL: http://ecma-international.org/publications/thes/ECMA-ST/ECMA-401.pdf>.

* cited by examiner

ELECTRONIC DEVICE WITH SHARED NEAR FIELD COMMUNICATIONS AND SENSOR STRUCTURES

BACKGROUND

This relates generally to electronic devices, and more particularly, to input-output circuitry such as sensor and communications circuitry for electronic devices.

Electronic devices such as portable computers and cellular telephones are often provided with input-output circuitry. The input-output circuitry may include electrical and optical circuits such as sensor circuits. Wireless communications circuitry may be provided for transmitting and receiving wireless signals. For example, electronic devices may include wireless communications circuitry such as cellular telephone circuitry, wireless local area network circuitry, and satellite navigation system circuitry. Some electronic devices use near field communications to wirelessly communicate with external equipment.

To satisfy consumer demand for small form factor devices, manufacturers are continually striving to implement input-output components such as sensors and wireless communications circuits using compact structures. Challenges can arise when incorporating input-output devices such as sensors and wireless circuits in an electronic device. For example, wireless component should generally not be blocked by conductive structures in a device, which can make it difficult to properly place a wireless component within an electronic device housing. If care is not taken, wireless devices and other input-output devices may consume more space within a device than is desired or may add undesired cost or complexity to a device.

It would therefore be desirable to be able to provide improved input-output circuitry such as improved wireless circuitry and sensor circuitry.

SUMMARY

An electronic device may have electrical components such as sensors. A sensor may have sensor circuitry that gathers sensor data. The sensor may be a touch sensor that uses a conductive structure to form a capacitive touch sensor electrode or may be a fingerprint sensor that uses a conductive structure associated with a fingerprint electrode array to handle fingerprint sensor signals. A touch sensor or fingerprint sensor may have an array of conductive electrodes for gathering sensor data from the front face of an electronic device, an edge of an electronic device, a button in an electronic device, or other portion of an electronic device. A fingerprint sensor or other sensor may also be formed using optical structures such as one or more light sources and receivers.

Near field communications circuitry may be included in the electronic device. Circuitry such as filter or switching circuitry may be used to couple both the near field communications circuitry and the sensor circuitry to a common conductive structure. This allows the conductive structure to be shared between sensor functions such as fingerprint or touch sensor functions and near field communications functions.

Control circuitry within the electronic device may operate the device in multiple modes. When operated in a sensor mode, the sensor circuitry may use the conductive structure to gather fingerprint data or other sensor data. When operated in near field communications mode, the near field communications circuitry can use the conductive structure to transmit and receive capacitively coupled or inductively coupled near field communications signals.

A fingerprint sensor formed using optical structures such as one or more optical transmitters and one or more receivers may gather fingerprint data optically. The control circuitry in the electronic device may use the optical structures of the fingerprint sensor in communicating with external equipment.

Further features of the invention, its nature and various advantages will be more apparent from the accompanying drawings and the following detailed description of the preferred embodiments.

DETAILED DESCRIPTION

Figure 1:
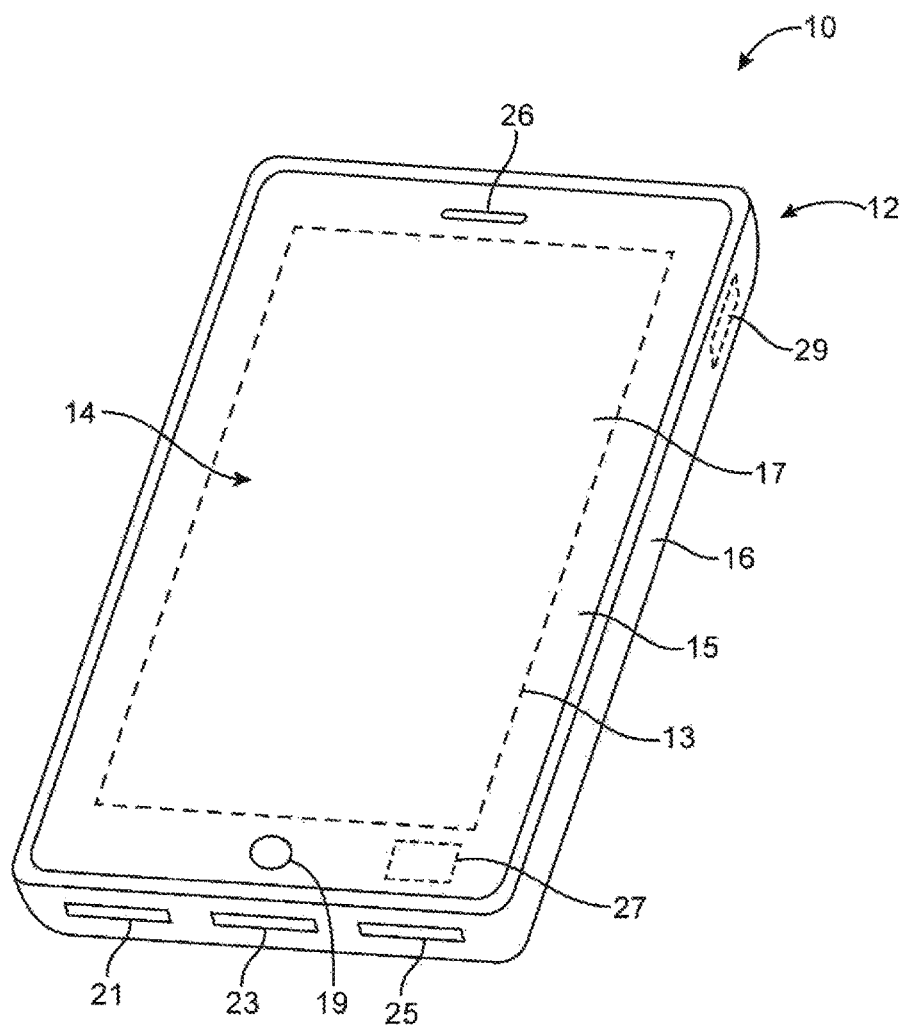
FIG. 1 is a front perspective view of an illustrative electronic device of the type that may have a sensor or other component with structures that may be used in near field communications in accordance with an embodiment of the present invention.

Electronic devices such as electronic device 10 of FIG. 1 may be provided with sensors and other electronic components. Structures in these components may be configured to form capacitor structures, inductor structures, or other structures for supporting near field communications (NFC) in addition to sensor operations. If desired, optical structures may be used both in capturing fingerprint data or other sensor data and in performing optical communications with external equipment.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electrowetting pixels, electrophoretic pixels, liquid crystal display (LCD) components, or other suitable image pixel structures. A cover layer such as a layer of clear glass or plastic may cover the surface of display 14. Buttons such as button 19 may pass through openings in the display cover layer. The display cover layer may also have other openings such as an opening for speaker port 26.

Display 14 may have an active region and an inactive region. For example, display 14 may have an active region such as central rectangular region 17. Active region 17 may be bounded by rectangular periphery 13 and may be surrounded by an inactive region such as rectangular ring-shaped inactive region 15. Active region 17 may contain active display pixels for displaying images for a user of device 10. Inactive region 15 may be free of active image pixels. An opaque masking layer may be provided on the underside of the display cover layer for display 14 in region 15 to help hide internal components in device 10 from view by a user of device 10. If desired, display 14 may be implemented using a borderless design and/or using display structures that cover some or all of the sidewalls and/or other surfaces of device 10. The configuration of FIG. 1 is merely illustrative.

Housing 12 may have openings such as openings 21, 23, and 25. Openings such as opening 23 may be used to form input-output ports (e.g., ports that receive analog and/or digital connectors such as Universal Serial Bus connectors, 30-pin data connectors, data connectors with 5-10 contacts, audio jack connectors, video connectors, or other connectors). Openings such as openings 21 and 25 may be used to accommodate electrical components such as audio components or other electrical devices. Opening 21 may, for example, form a microphone port and opening 25 may form a speaker port. Other portions of housing 12 such as other sidewall portions or other portions of the front or rear planar surface of device 10 may also be provided with structures to accommodate components.

Device 10 may have a front face (e.g., the front surface covered by display 14 in the example of FIG. 1), an opposing rear face (e.g., a rear housing wall in housing 12), and sidewall structures such as sidewall structures 16 of housing 12 (as an example). Sensors for device 10 may be incorporated into components such as button 19, may be formed on parts of the front face of device 10 such as region 27 in inactive area 15, in part of active area 17, on sidewall areas such as region 29, on the rear of device 10, or on other suitable portions of device 10.

Sensors may, in general, be used for transmitting and or receiving signals. Examples of sensors include optical sensors (e.g., ambient light sensors, light-based proximity sensors, light-based fingerprint sensors, etc.), touch sensors (e.g., touch sensors based on capacitive electrodes, touch sensors based on acoustic signals, touch sensors based on force sensors, touch sensors based on light, etc.), heat sensors, and acoustic sensors. These sensors may have structures such as conductive structures that may be used in forming capacitor structures and/or inductor structures for supporting near field communications. These sensors may also include optical components that can be used both in performing sensing functions and in wirelessly communicating with external equipment.

Figure 2:
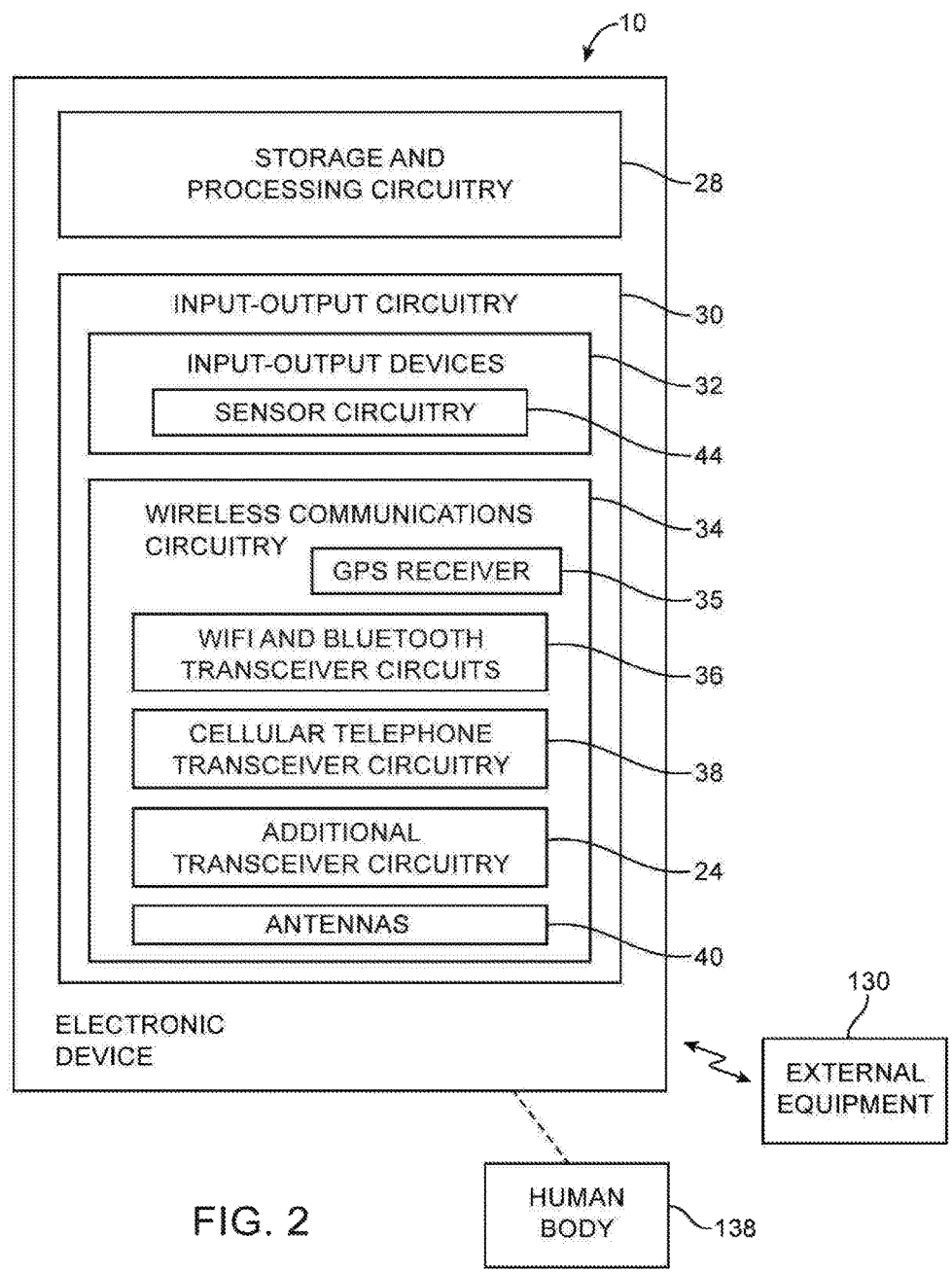
FIG. 2 is a schematic diagram of a system including an illustrative electronic device having a sensor with structures that may be used in near field communications with external equipment and that may be used to sense a human body or other external object in accordance with an embodiment of the present invention.

A schematic diagram of an illustrative configuration that may be used for electronic device 10 is shown in FIG. 2. As shown in FIG. 2, electronic device 10 may wirelessly communicate with external equipment 130 (e.g., using near field communications and/or optical communications and/or other wireless communications arrangements). A user may use a finger or other human body part or external object (e.g., human body 138) to supply device 10 with user input. For example, a user's finger may be used to supply a touch command or fingerprint to device 10 to control the operation of device 10.

As shown in FIG. 2, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, near field communications protocols, etc.

Circuitry 28 may be configured to control the operation of sensors and to take suitable actions based on sensor data and other input. For example, circuitry 28 may gather input from a fingerprint sensor, a touch sensor, or other sensor components and may use this gathered input in controlling the operation of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensor circuitry 44 for fingerprint sensors, touch sensors (e.g., touch sensors in a touch screen or separate from a display), ambient light sensors, light-based proximity sensors, capacitive proximity sensors, heat sensors, accelerometers, and other sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or satellite navigation system receiver circuitry associated with other satellite navigation systems. Transceiver circuitry 36 may handle 2.4 GHz and 5 GHz bands for WiFi® (IEEE 802.11) communications, may handle the 2.4 GHz Bluetooth® communications band, and may handle other wireless local area network communications bands of interest (e.g., 60 GHz signals associated with IEEE 802.11ad communications). Circuitry 34 may use cellular telephone transceiver circuitry 38 for handling wireless communications in cellular telephone bands such as bands in frequency ranges of about 700 MHz to about 2700 MHz or bands at higher or lower frequencies. Wireless communications circuitry 34 can include circuitry for other short-range and long-range wireless links if desired. For example, wireless communications circuitry 34 may include wireless circuitry for receiving radio and television signals, paging circuits, etc. Transceiver circuitry 24 may be used in performing near field communications operations (e.g., using capacitively coupled or inductive near field communications structures). Transceiver circuitry such as transceiver circuitry 24 may also be used in transmitting and receiving optical signals (e.g., for establishing optical links with adjacent external equipment).

In WiFi® and Bluetooth® links and other short-range wireless links, wireless signals are typically used to convey data over tens or hundreds of feet. In cellular telephone links and other long-range links, wireless signals are typically used to convey data over thousands of feet or miles. In near field communications schemes, wireless signals are typically conveyed over distances of 1 m or less, 100 cm or less, 10 cm or less, or 1 cm or less (as examples) and are not conveyed over larger distances.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link.

To support near field communications using a capacitively coupled and/or inductively coupled near field communications structures, device 10 may include capacitor structures (e.g., capacitor electrodes), inductor structures (e.g., one or more looped conductors), and other conductive structures. If desired, some or all of these structures may be shared with sensor structures in sensor circuitry 44. For example, some of the conductive structures in sensor circuitry 44 such as electrodes in a fingerprint sensor or touch sensor may be used in forming capacitor electrodes and/or inductors for near field communications using near field communications transceiver circuitry 24.

Figure 3:
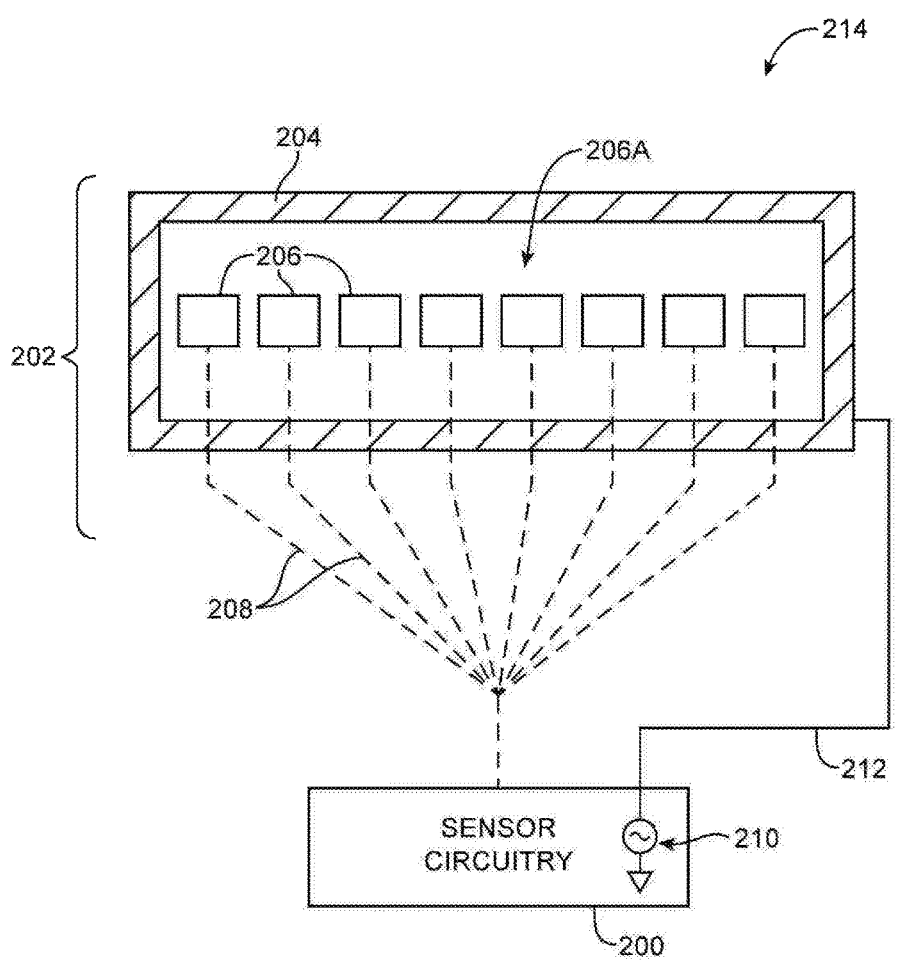
FIG. 3 is a diagram of an illustrative sensor of the type that may be used in an electronic device of the type shown in FIGS. 1 and 2 in accordance with an embodiment of the present invention.

As an example, conductive structures in a fingerprint sensor may be used in forming near field communications structures. An illustrative fingerprint sensor of the type that may have electrodes that serve as near field communications structures is shown in FIG. 3. As shown in FIG. 3, sensor circuitry 214 may include electrode structures 202. Electrode structures 202 may include a ring-shaped electrode such as electrode 204 that surrounds an array (e.g., a one-dimensional array) of electrodes such as electrodes 206. Electrodes 206 may be coupled to sensor circuitry 200 using respective signal lines 208.

Sensor circuitry 200 may contain a signal source such as signal source 210. During operation, a user may swipe a finger across electrode 204 and array 206A of electrodes 206 (e.g., a user may move a fingertip downwards across electrodes 204 and 206). During finger swiping, signal source 210 may drive an alternating current signal (e.g., a signal from 1 to 5 MHz or other suitable frequency) into electrode 204. This drive signal may be coupled into the user's finger from electrode 204 when the user's finger is placed over electrode 204 (i.e., due to the contact of the user's finger with at least some of electrode 204 or due to the close proximity of the finger to electrode 204 in scenarios in which electrode 204 and the user's finger are separated by an air gap or a layer of plastic, glass, or other dielectric). Each signal line 208 may be coupled between a respective electrode 206 and a corresponding sensor circuit in sensor circuitry 200. The magnitude of the drive signal that is coupled to each of electrodes 206 from the user's finger may be measured by monitoring the signals on lines 208. As fingerprint ridges pass over electrodes 206, different amounts of signal are coupled into electrodes 206 from the finger. By providing a sufficiently dense array 206A of electrodes 206 in sensor structures 202 (e.g., 1 or more per mm, 10 or more per mm, or 100 or more per mm), sensor circuitry 214 may be used to capture a digital representation of the user's fingerprint.

Figure 4:
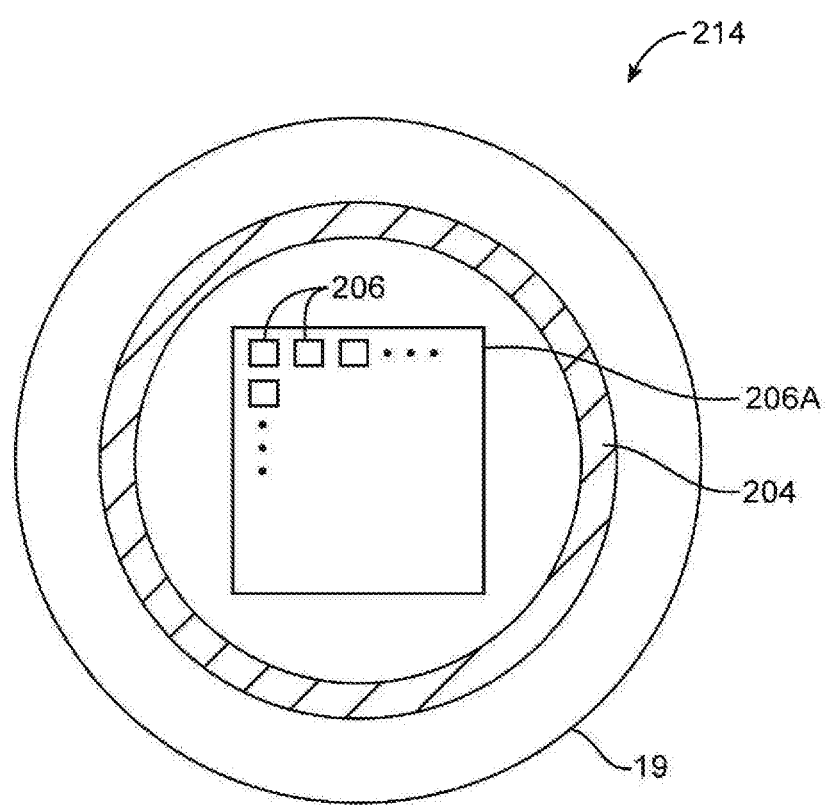
FIG. 4 is diagram of a sensor with a circular ring-shaped electrode surrounding an array of electrodes in accordance with an embodiment of the present invention.

If desired, fingerprint sensors for device 10 may be formed using a two-dimensional array of electrodes. Consider, as an example, illustrative sensor circuitry 214 of FIG. 4. As shown in FIG. 4, sensor circuitry 214 may include electrode structures 202 such as outer ring electrode 204 and a two-dimensional array 206A of electrodes 206. Array 206A may, as an example, include 90-100 rows and 90-100 columns of electrodes 206. Other numbers of electrodes and other array shapes may be used in sensor circuitry 214 if desired. For example, array 206A may include 100 or more electrodes 206, 500 or more electrodes 206, 1000 or more electrodes 206, 5000 or more electrodes, or other suitable number of electrodes. Outer electrode 204 may have a circular shape, an oval shape, a rectangular ring shape, or other suitable shape (e.g., other ring shapes or non-ring shapes).

Sensors such as the sensors of FIGS. 3 and 4 may, if desired, be incorporated into parts of device 10 such as button 19, portions of display 14 such as region 27 or part of active region 17, edge portions of device 10 such as region 29, etc. In the example of FIG. 4, a fingerprint sensor has been formed as part of button 19.

Figure 5:
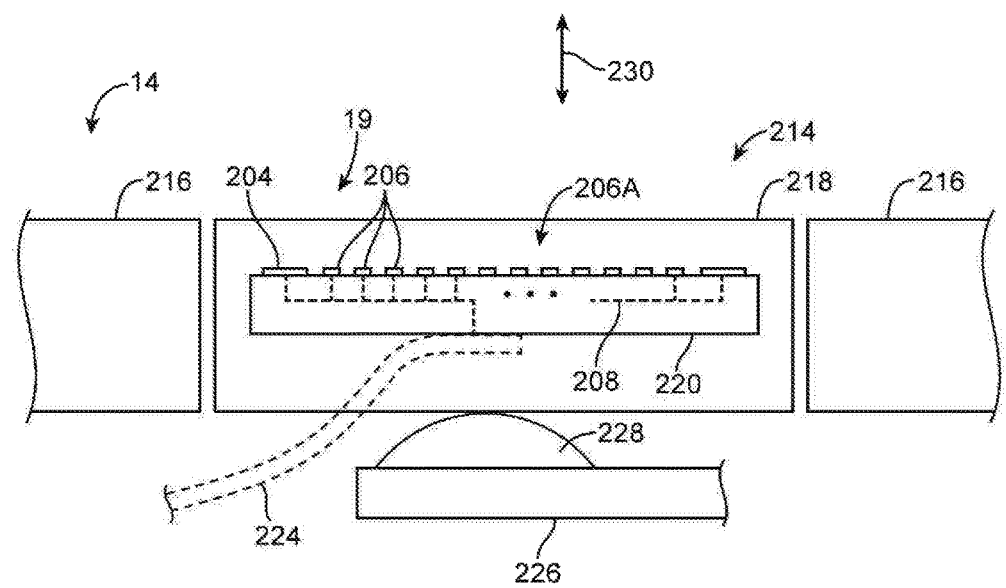
FIG. 5 is a cross-sectional side view of an illustrative sensor such as the sensor of FIG. 4 mounted in a button in an electronic device in accordance with an embodiment of the present invention.

FIG. 5 is a cross-sectional side view of a button such as button 19 of FIG. 4 in which fingerprint sensor circuitry 214 has been formed. As shown in FIG. 5, button 19 may be formed from a button member such as button member 218. Button member 218 may be received within an opening in display cover layer 216 in display 14 and may move up and down in vertical dimension 230. When pressed downwards, button member 218 may compress dome switch 228 on support structure 226, thereby closing switch 228. When released, dome switch 228 or other biasing structures may force button member 218 to move upwardly towards its original position. Control circuitry 28 (FIG. 2) may sense when switch 228 is closed and when switch 228 is open and can take suitable action.

Fingerprint sensor 214 may include an array of sensor electrodes such as array 206A of electrodes 206. Array 206A may be, for example, a rectangular array such as array 206A of FIG. 4. Ring-shaped electrode 204 may be a circular ring or a ring of other suitable shape that surrounds electrode array 206A.

Electrodes 204 and 206 may be formed on a substrate such as substrate 220 (e.g., a plastic substrate, a printed circuit such as a flexible printed circuit formed from a sheet of polyimide or other polymer layer or a rigid printed circuit board, or other dielectric such as glass or ceramic). Member 218 may be formed from glass, plastic, ceramic, or other suitable dielectric materials. Substrate 220 may be attached to the underside of member 218, may be embedded within member 218 (e.g., by laminating substrate 220 between other layers, using insert molding, or using other suitable fabrication techniques). Conductive traces 208 may be used to route signals from the electrodes to associated sensor circuitry such as sensor circuitry 200 (e.g., via a cable with wires, using a flexible printed circuit cable such as cable 224, etc.).

If desired, an array of sensor electrodes for a fingerprint sensor or a capacitive touch sensor may be formed on an edge portion of device 10 such as edge portion 29 (FIG. 1).

Figure 6:
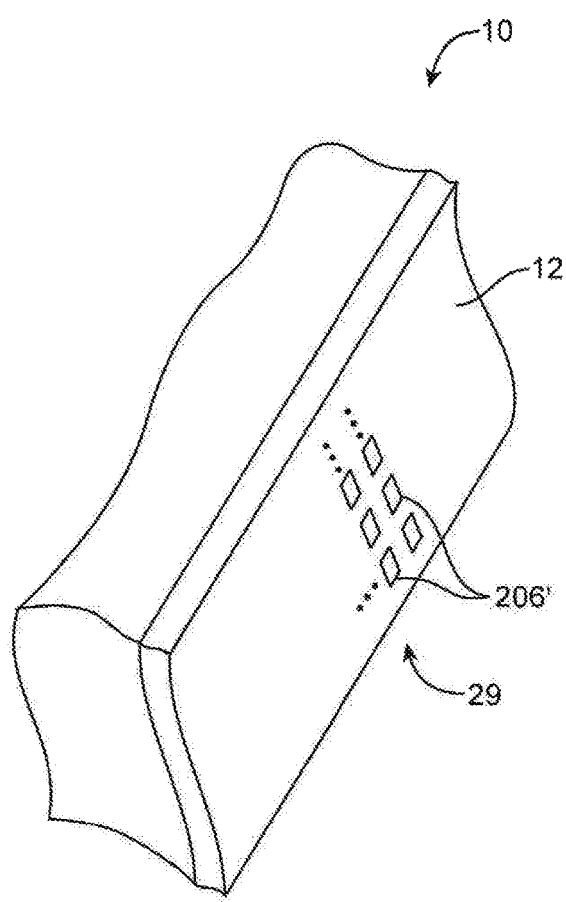
FIG. 6 is a diagram of an edge portion of an electronic device with an illustrative sensor having structures that may be used in near field communications in accordance with an embodiment of the present invention.

FIG. 6 is a perspective view of an edge portion of housing 12 of device 10 showing how electrodes 206' may be formed in two or more rows and two or more columns along the edge of device 10 such as edge portion 29. A sensor formed using electrodes 206' of FIG. 6 may be used for capturing a user's fingerprint and/or for serving as a touch sensor that receives user input to control the operation of device 10 (e.g., a touch sensor that receives commands that direct device 10 to scroll through content on display 14, a touch sensor that receives gesture input, or other suitable touch sensor).

Figure 7:
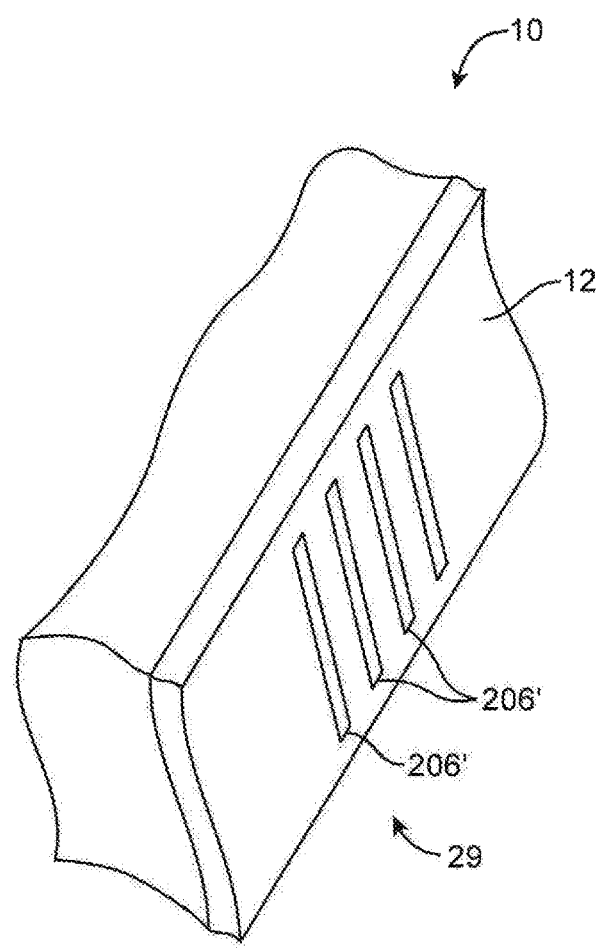
FIG. 7 is a diagram of an edge portion of an electronic device with another illustrative sensor having structures that may be used in near field communications in in accordance with an embodiment of the present invention.

In the illustrative configuration of FIG. 7, electrodes 206' have been configured to form a one-dimensional array that runs parallel to the edge of device 10. As with electrode structures 202 of FIGS. 3 and 4, electrodes 206' of FIGS. 6 and 7 may, if desired, be configured to form a sensor such as a fingerprint sensor. Electrodes such as electrodes 206', 206, and 204 may also be configured to form capacitive touch sensor electrodes. Electrodes in regions of device 10 such as button 19, region 27 of inactive display area 15, active region 17, edge region 29, or other regions of device 10 may, for example, form touch sensors for detecting user gestures and other touch commands. Electrodes (for touch sensors and/or fingerprint sensors) may be formed from conductive materials such as metal, indium tin oxide or other transparent conductive materials, or other suitable materials.

Near field communications for device 10 may be supported using capacitive coupling near field communications structures and/or inductive coupling near field communications structures.

Figure 8:
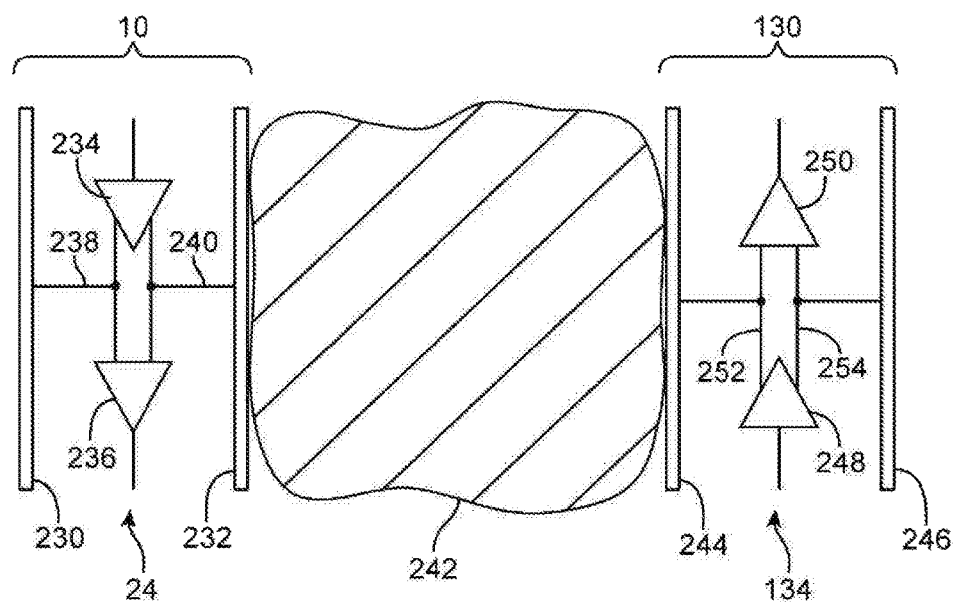
FIG. 8 is a diagram showing how device structures may communicate with external equipment using capacitively coupled near field communications in accordance with an embodiment of the present invention.

An illustrative capacitive coupling near field communications arrangement that may be used by device 10 to communicate with external equipment 130 is shown in FIG. 8. As shown in FIG. 8, device 10 may have capacitor electrodes such as electrodes 230 and 232. Mediator 242 may be a human body or part of a human body, air or other dielectrics, conductive materials, or other interposed material between device 10 and external equipment 130. External equipment may have capacitor electrodes such as electrodes 244 and 246. Electrodes such as electrodes 230 and 246 may be coupled via an imaginary short. During transmission from device 10 to equipment 130, electrode 232 may induce changes in charge on the adjacent portion of mediator 242, which results in corresponding induced charge changes on the far side of mediator 242 and electrode 244. During transmission from equipment 130 to device 10, electrode 244 may induce changes in the charge on the portion of mediator 242 that is adjacent to electrode 244 that likewise result in changes in the signal on electrode 232.

Near field transceiver circuitry (e.g., transceiver circuitry 24 of FIG. 2) may include a near field transmitter such as transmitter 234 and a near field receiver such as near field receiver 236. Transmitter 234 may supply differential output signals on output paths 238 and 240, respectively. These output signals may be supplied to capacitor electrodes 230 and 232. During signal reception operations, signals from capacitor electrodes 230 and 232 may be received on paths 238 and 240 by differential receiver 236.

External equipment 130 may have near field transceiver circuitry 134 including a transmitter such as transmitter 248 for driving output signals onto electrodes 244 and 246 via paths 252 and 254, respectively and including a receiver such as receiver 250 for receiving signals from electrodes 244 and 246 via paths 252 and 254, respectively.

During operation, capacitively coupled signals from the near field transmitter in device 10 may pass through mediator 242 to reach the near field receiver in external equipment 130. When it is desired to convey signals from external equipment 130 to device 10, the near field transmitter in external equipment 130 may transmit signals that pass through mediator 242 to the near field receiver in device 10. In free space near field coupling scenarios, mediator 242 may be primarily made up of air. In body coupled communications scenarios, mediator 242 may be all or part of the user's body.

Electrodes in device 10 such as electrodes 232 and 230 may be formed from conductive structures in device components. For example, one or more capacitor electrodes in device 10 may be made up of electrodes in a touch sensor, fingerprint sensor, or other sensor circuitry. The touch sensor electrodes that are used as near field communications capacitive coupling structures in an arrangement of the type shown in FIG. 8 may be, for example, one or more capacitive touch sensor electrodes in a touch sensor (see, e.g., electrodes 206' in a touch sensor on the edge of device 10, touch sensor electrodes in display 14, touch sensor electrodes on a track pad or other touch sensitive device, etc.), one or more sensor electrodes in a fingerprint sensor (e.g., one or more electrodes such as electrodes 206 and 204), or other electrode structures. External equipment 130 may be an electronic accessory, a point of sale terminal, a computer, or other external equipment. Capacitor electrodes 244 and 246 may be formed from metal plates or other suitable conductive structures. If desired, the shapes of electrodes 230, 232, 244, and 246 may be configured to enhance capacitive coupling. For example, electrode 244 may be configured to have a ring shape that matches a ring shape used for electrode 232.

Figure 9:
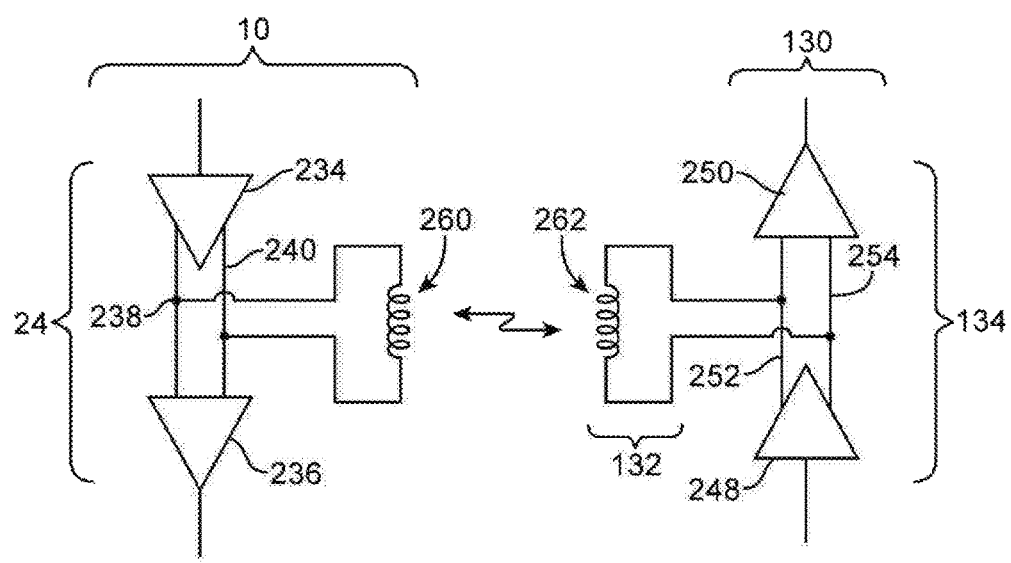
FIG. 9 is a diagram of illustrative device circuitry and external equipment circuitry that may be used in inductively coupled near field communications in accordance with an embodiment of the present invention.

An illustrative inductive coupling near field communications arrangement that may be used by device 10 to communicate with external equipment 130 is shown in FIG. 9. As shown in FIG. 9, device 10 may have inductive structures such as inductor 260. Inductor 260 may have a pair of terminals coupled to paths 238 and 240, respectively. Inductor 260 may be used to convey wireless signals through the air (or other medium). When transmitting, signals from inductor 260 may be received by inductor 262 in external equipment 130. When external equipment 130 is transmitting wireless signals with inductor 262, inductor 260 in device 10 may be used in receiving the transmitted signals.

Near field transceiver circuitry 24 in device 10 may include a near field transmitter such as transmitter 234 and a near field receiver such as near field receiver 236. Transmitter 234 may supply differential output signals on output paths 238 and 240, respectively. These output signals may be supplied to the terminals of inductor 260. During signal reception operations, signals from inductor 260 may be received on paths 238 and 240 by differential receiver 236.

External equipment 130 may have near field transceiver circuitry that includes a transmitter such as transmitter 248 for driving output signals through inductor 262 via paths 252 and 254, respectively and that includes a receiver such as receiver 250 for receiving signals from inductor 262 via paths 252 and 254, respectively.

During operation, inductively coupled signals from the near field transmitter in device 10 may be wirelessly conveyed to the near field receiver in external equipment 130. When it is desired to convey signals from external equipment 130 to device 10, the near field transmitter in external equipment 130 may transmit signals using inductor 262 that are received by inductor 260 in device 10.

Inductive structures such as inductor 260 in device 10 may be formed from conductive structures in device components. For example, one or more inductive structures in device 10 (e.g., inductor 260) may be made up of conductive structures in a touch sensor, fingerprint sensor, or other sensor circuitry. The touch sensor electrodes that are used as near field communications inductive coupling structures in an arrangement of the type shown in FIG. 9 may be, for example, one or more touch sensor electrodes in a touch sensor, one or more sensor electrodes in a fingerprint sensor, or other electrode structures. To ensure that the conductive structures exhibit sufficient inductance, the conductive structures can be configured to form conductive loops (e.g., loops with one or more turns of conductive lines). External equipment 130 of FIG. 9 may be an electronic accessory, a point of sale terminal, a computer, or other external equipment.

Figure 10:
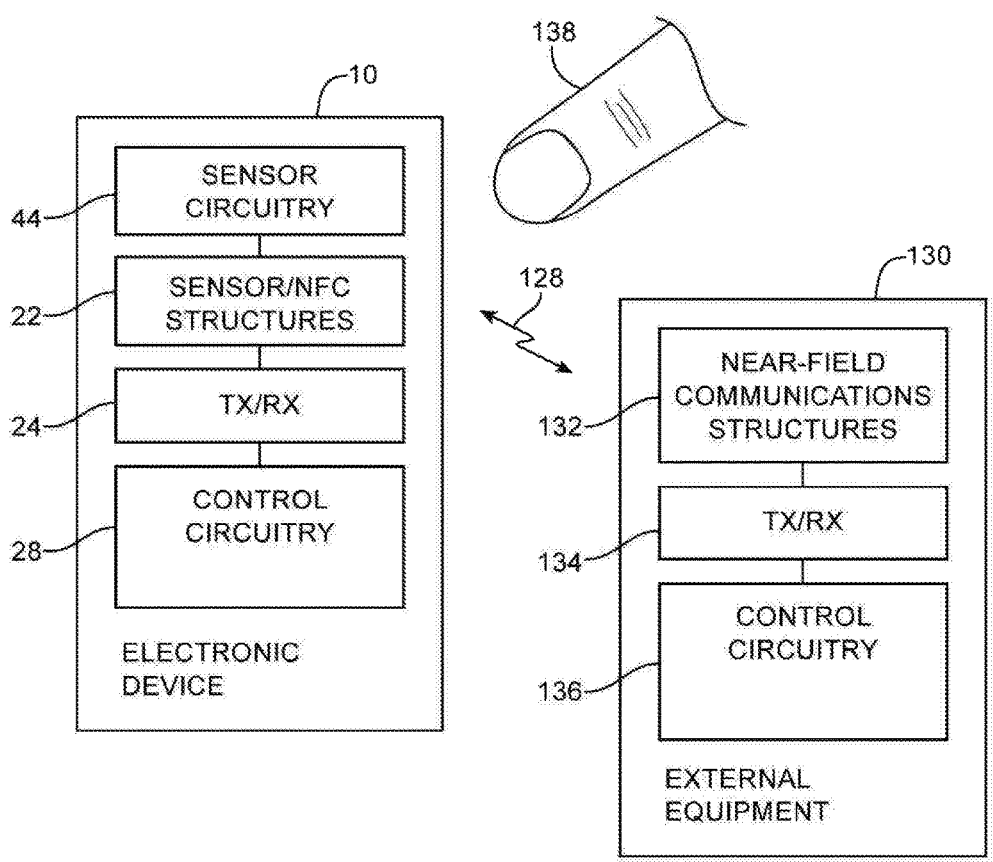
FIG. 10 is a diagram showing how device circuitry may be configured to sense an external object such as a portion of a human body and may be configured to wirelessly communicate with external equipment using near field communications in accordance with an embodiment of the present invention.

FIG. 10 is a diagram showing how device 10 may have structures such as sensor/NFC structures 22 that are used both as near field communications elements (e.g., capacitor plates such as electrode 230 and/or electrode 232 or parts of such conductive capacitor structures) and inductive elements (e.g., inductor 260 or part of inductor 260) and as elements of an electronic component such as a sensor component (e.g., as an electrode in a fingerprint sensor, an electrode in a touch sensor, etc.). As shown in FIG. 10, device 10 may use sensor/NFC structures 22 to receive input from an external object such as a user's finger (finger 138 of FIG. 10) and may communicate wirelessly (see, e.g., wireless signal 128) with external equipment using near field communications. With this type of arrangement, sensor circuitry 44 and near field transceiver 24 may share structures 22 in device 10, reducing component count and helping to ensure that near field communications structures 22 are well placed on device 10 (i.e., so that near field communications structures are not blocked by portions of a conductive housing or conductive device structures).

Device 10 may be a cellular telephone, a tablet computer, a laptop computer, a desktop computer, a wristwatch device or other miniature or wearable device, a handheld device or other portable device, or other suitable electronic equipment. External equipment 130 may be a peer device (e.g., a device such as device 10 that is operated by another user), a device accessory (e.g., a cradle that can receive device 10, headphones or other audio accessories, etc.), a near field communications point of sale terminal for handling wireless payments and other wireless transactions, a near field communications reader associated with security equipment (e.g., a door opener, a badge reader, etc.), a computer with near field communications capabilities (e.g., for security), a kiosk, embedded equipment in automated product or service dispensing equipment, equipment in an automobile, or other external equipment.

In a typical system environment, device 10 may sometimes communicate with one type of near field communications equipment and may, at other times, communicate with one or more other types of near field communications equipment. For example, a user of device 10 may place device 10 near to a point of sale terminal when it is desired to make a wireless payment, may place device 10 near a door lock when it is desired to obtain access to a building, may place device 10 near a security card reader when it is desired to authenticate to a computer system, and may place device 10 near to an audio device when it is desired to communicate with the audio device using near field communications.

As shown in FIG. 10, electronic device 10 and external equipment 130 may include control circuitry 28 and 136, respectively. Control circuitry 28 and 136 may include microprocessors, microcontrollers, digital signal processors, application-specific integrated circuits, storage such as volatile and non-volatile memory (e.g., hard drives, solid state drives, random-access memory, etc.), and other storage and processing circuitry.

Device 10 and external equipment 130 may also include transceiver circuitry such as transceiver circuitry 24 and 134, respectively. Transceiver circuitry 24 and 134 may include one or more radio-frequency transmitters, one or more radio-frequency receivers, both transmitters and receivers, or other suitable communications circuitry for generating radio-frequency signals for near field communications (e.g., transceiver circuitry operable at an NFC communications band at 13.56 MHz or other suitable frequency).

With one illustrative arrangement, device 10 includes a transmitter (i.e., transceiver 24 may be a transmitter) and equipment 130 includes a corresponding receiver (i.e., transceiver 134 may be a receiver). This type of arrangement may be used to support unidirectional near field communications between device 10 an external equipment 130. If desired, bidirectional near field communications may be supported. For example, transceiver 24 may include a transmitter and a receiver and transceiver circuitry 134 may include a transmitter and a receiver. Wireless near field communications signals 128 may, in general, be communicated from device 10 to equipment 130, from equipment 130 to device 10, or both from device 10 to equipment 130 and from equipment 130 to device 10.

Device 10 may include structures 22. Structures 22 may include structures that are configured both as near field communications elements (e.g., capacitors and/or inductors) and as electrodes in a fingerprint sensor, touch sensor, or other electrical component. Structures 132 may include near field communications structures such as capacitors or inductors that are configured to communicate with structures 22 using near field communications.

The structures of elements 22 and 132 are capable of transmitting and/or receiving near-field-coupled radio-frequency electromagnetic fields. When used as a sensor, structures 22 and sensor circuitry 44 may be used to capture a fingerprint from finger 138 or to gather touch input from finger 138 or other external object.

Figure 11:
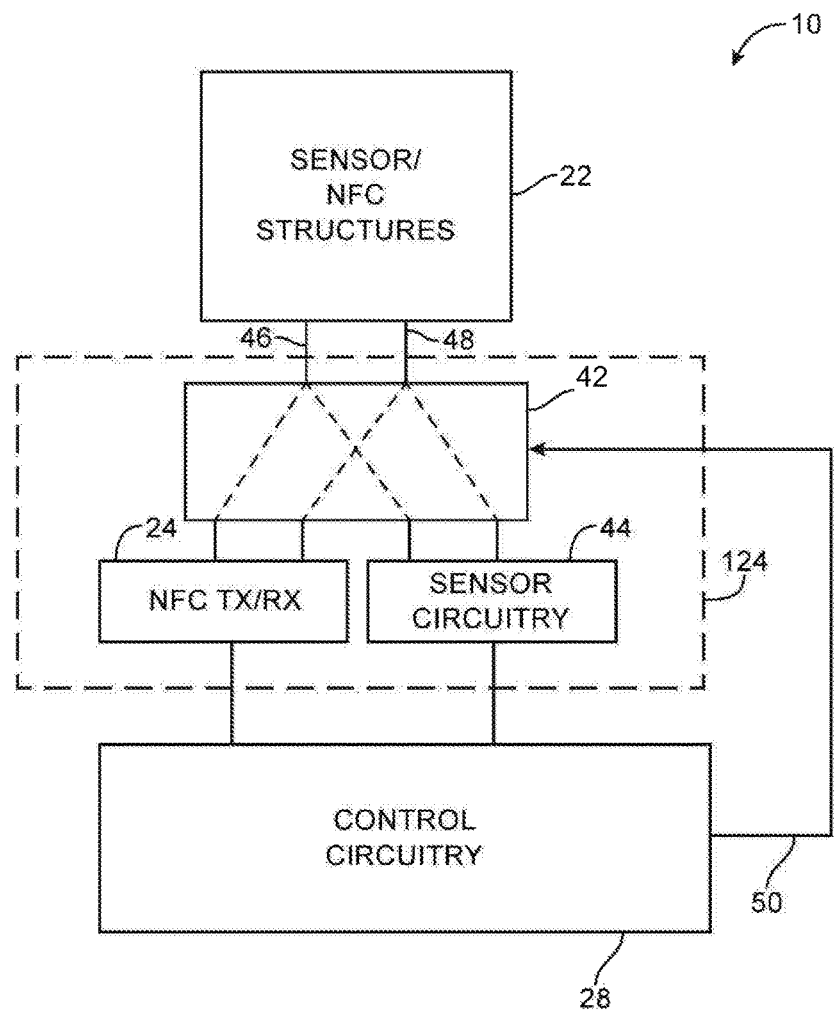
FIG. 11 is a diagram of illustrative circuitry that may be used in an electronic device to support use of conductive structures as part of a sensor and as part of a near field communications circuit in accordance with an embodiment of the present invention.

An illustrative configuration that may be used for sharing sensor/NFC conductive structures 22 between near field communications circuitry such as near field communications transceiver 24 and the circuitry associated with additional components such as sensor circuitry 44 is shown in FIG. 11. As shown in FIG. 11, device 10 may include structures 22 for use in near field communications (e.g., to serve as an inductive near field communications element or capacitive near field communications element) and for use as part of an electronic component such as a sensor. Structures 22 may be based on inductive structures (e.g., electrodes patterned as looped conductors that form one or more inductors), capacitor structures (e.g., one or more capacitor electrodes), or other near field communications structures (e.g., near field communications antenna structures). Terminal 46 may form a first terminal for structures 22 and terminal 48 may form a second terminal for structures 22.

Circuitry 124 may include transceiver circuits such as near field communications transceiver circuitry 24. Transceiver circuitry 24 may be used to transmit wireless payment information, media data, streaming data (e.g., when device 10 has been paired with an audio or video accessory), voice and data associated with a telephone call (e.g., when device 10 has been paired with audio equipment in an automobile), security card information, wireless lock information, or other information. Circuitry 124 may also include other circuitry (i.e., non-NFC circuitry) such as sensor circuitry 44. Sensor circuitry 44 may be associated with a fingerprint sensor, a touch sensor array for gathering other user touch input, a capacitance-based button, or other capacitive sensor.

Circuits 24 and 44 may be implemented using one or more integrated circuits. For example, circuit 24, circuit 44, and one or more integrated circuits in control circuitry 28 may be implemented using separate integrated circuits. If desired, circuit 24 and circuit 44 (and, optionally one or more control circuits within control circuitry 28) may be implemented using a common integrated circuit.

Circuit 42 may be used to couple multiple circuits such as near field communications transceiver 24 and sensor circuitry 44 to shared structures 22. Circuit 42 may, for example, be a passive coupler that allows circuits 24 and 44 to operate simultaneously. With this type of arrangement, frequency-based multiplexing may be used to accommodate sharing of structures 22. As an example, near field communications transceiver 24 may be configured to operate at a first radio frequency such as 13.56 MHz and sensor circuitry 44 may be configured to operate at a second radio frequency such as a frequency in the range of about 1-3 MHz, 1-10 MHz, less than 10 MHz, or other suitable frequency (as examples). In this type of arrangement, circuitry 42 can be configured to form a frequency-based multiplexing filter that routes signals to and from structures 22, 24, and 44 based on their frequency.

If desired, circuitry 42 may be implemented using switching circuitry that selectively couples either circuit 24 or circuit 44 to terminals 46 and 48 in response to control signals received from control circuitry 28. This type of arrangement allows control circuitry 28 to configure circuitry 42 so that near field communications transceiver 24 can transmit and/or receive near field communications signals using structures 22 or to configure circuitry 42 so that sensor circuitry 44 can use structures 22 to gather capacitive sensor signals (e.g., from a fingerprint sensor, a touch-based button, a touch sensor array for a track pad or touch screen, or other touch sensor).

If desired, switching circuitry configurations of this type may be used to selectively couple three or more transmitters to a near field communications element.

Path 50 may be used to convey one or more control signals between control circuitry 28 and switching circuitry 42. When it is desired to transmit and/or receive NFC signals with NFC transceiver 24, control circuitry 28 may provide control signals to switching circuitry 42 via control path 50 that direct switching circuitry 42 to operate in a near field communications (NFC) mode. In the NFC mode, NFC transceiver 24 may be coupled to structures 22 and may be used in conveying NFC signals (e.g., wireless NFC data for a wireless payment, for wireless data synching, for security applications, for wireless lock functions, etc.) to external equipment (e.g., a wireless point of sale terminal, etc.). When it is desired to convey capacitive sensor signals between structures 22 and sensor circuitry 44, control circuitry 28 may provide control signals to switching circuitry 42 over path 50 that direct switching circuitry 42 to operate in a sensor mode (e.g., a fingerprint sensor mode, touch sensor mode, etc.). After placing switching circuitry 42 in the sensor configuration, sensor circuitry 44 may be used to process sensor signals from structures 22 (e.g., to capture a fingerprint, to gather touch commands, etc.). Because structures 22 can be used for both near field communications and sensor functions, the hardware resources associated with supporting these operations in device 10 may be minimized. The sharing of structures 22 between near field communications and sensor functions may also make it easier to mount conductive structures 22 at an appropriate location within the potentially compact volume available within device 10.

Figure 12:
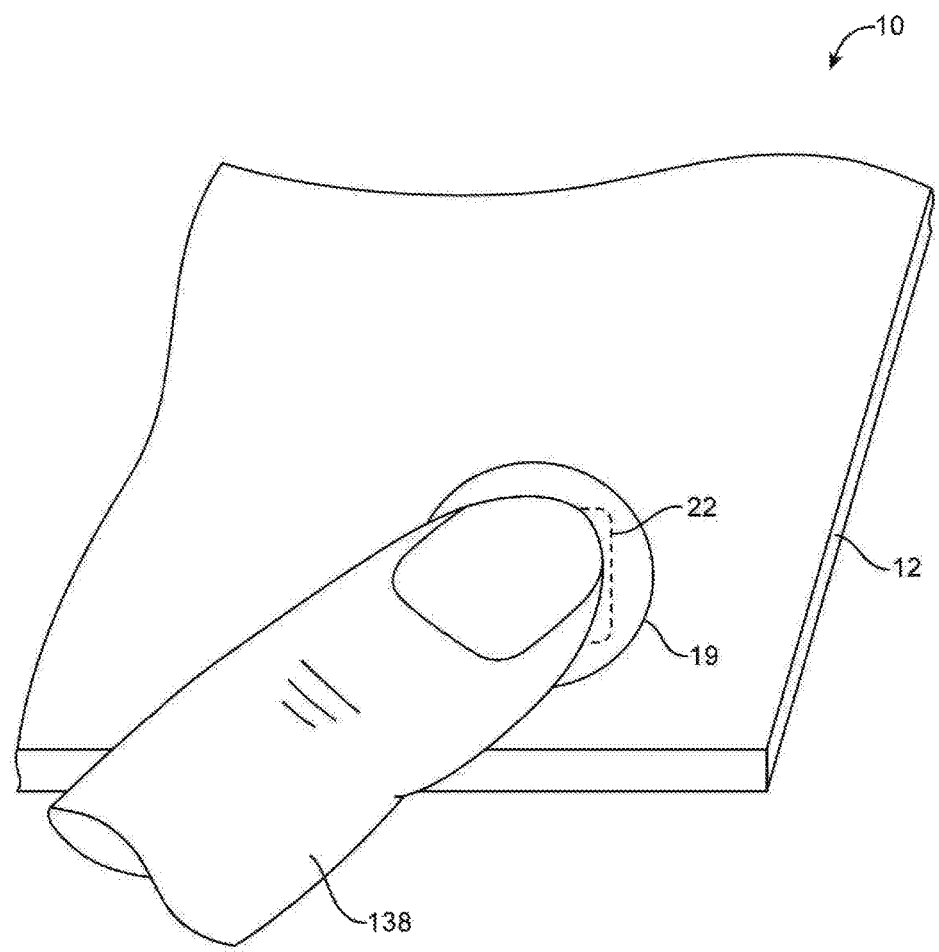
FIG. 12 is a perspective view of a portion of an electronic device having a sensor in a button that may be configured to take sensor readings and to perform near field communications operations in accordance with an embodiment of the present invention.

If desired, structures 22 may be integrated into a button such as button 19 of device 10. This type of configuration is shown in FIG. 12. As shown in FIG. 12, a user may place a finger such as finger 138 over button 19 during use of device 10. Device 10 may use a switch under button 19 to detect button presses. Device 10 may use sensor circuitry 44 and structures 22 in button 19 to capture fingerprints (or other capacitive sensor data). When it is desired to use transceiver circuitry 24 for near field communications, structures 22 in button 19 may be used in transmitting and/or receiving near field communications.

Figure 13:
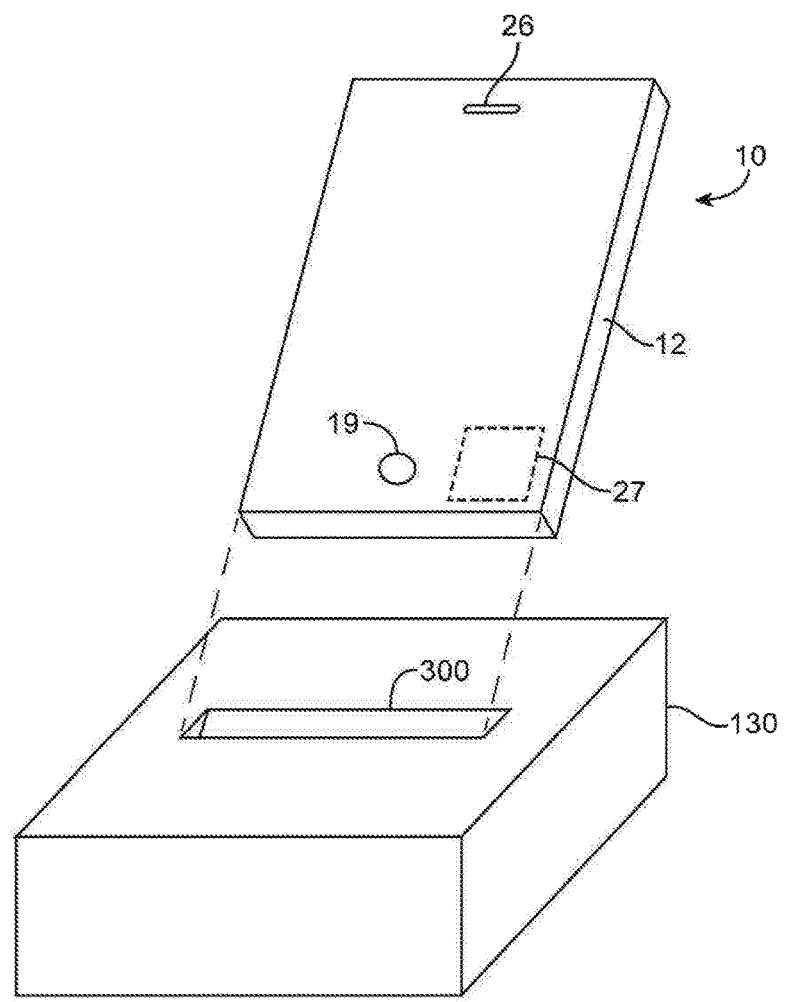
FIG. 13 is a perspective view of an illustrative electronic device being inserted into a mating cradle accessory in accordance with an embodiment of the present invention.

Using structures 22 that have been incorporated into region 27, into region 29, into button 19, or other portions in device 10, device 10 may communicate with mating near field communications structures (e.g., structures 132 and circuitry 134 of FIG. 10) when mated with external equipment such as illustrative accessory 130 of FIG. 13. Accessory 130 may be, for example, external equipment such as a cradle having an opening such as opening 300. Cradle 130 may be implemented using a stand-alone housing or may be incorporated into an automobile system, stereo system, television, or other equipment.

Figure 14:
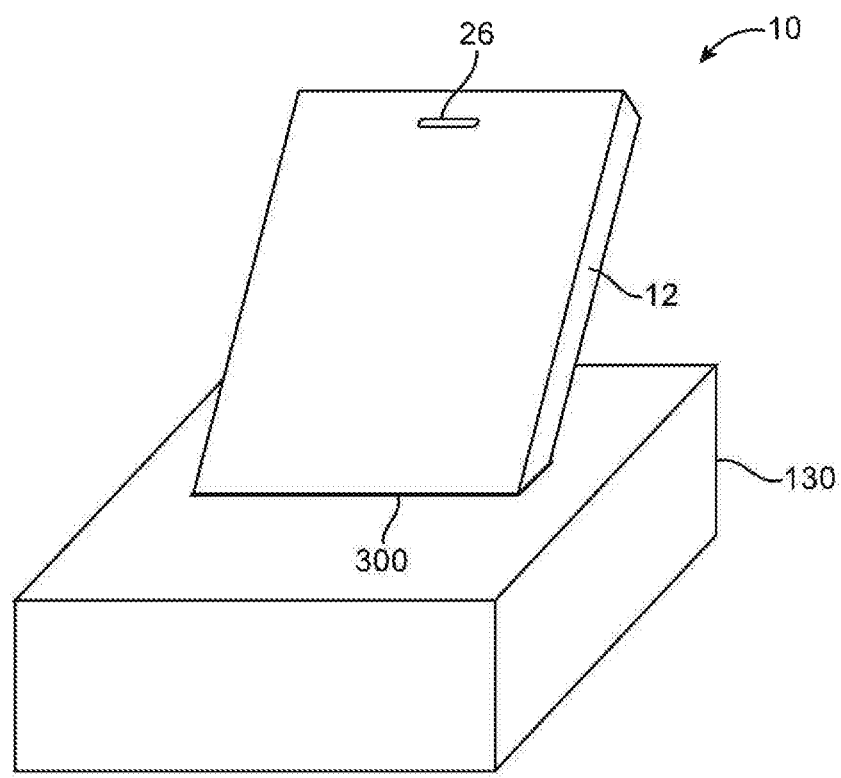
FIG. 14 is a perspective view of the electronic device of FIG. 13 following insertion of the device into the cradle of FIG. 13 in accordance with an embodiment of the present invention.
Figure 15:
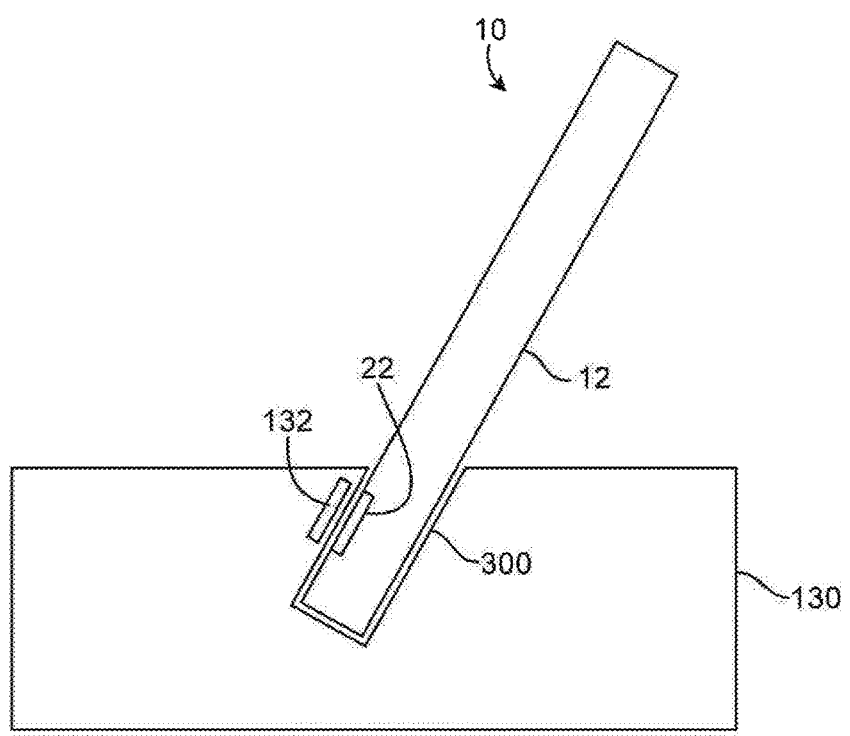
FIG. 15 is a cross-sectional side view of the electronic device of FIGS. 13 and 14 following insertion of the device into the cradle of FIGS. 13 and 14 in accordance with an embodiment of the present invention.

In the configuration shown in FIG. 13, device 10 has not yet been inserted into opening 300. In the configuration shown in FIG. 14, device 10 has been mated with accessory 130. In particular, device 10 has been inserted into opening 300, so that the lower end of device housing 12 is surrounded by the sidewalls of opening 300, holding device 10 in place on accessory 130. As shown in the cross-sectional side view of FIG. 15, this allows wireless near field communications signals to be conveyed between structures 22 in device 10 (e.g., structures 22 in button 19 and/or a region such as region 27 on a touch screen or inactive portion of a display) and near field communications structures 132 in equipment 130.

Figure 16:
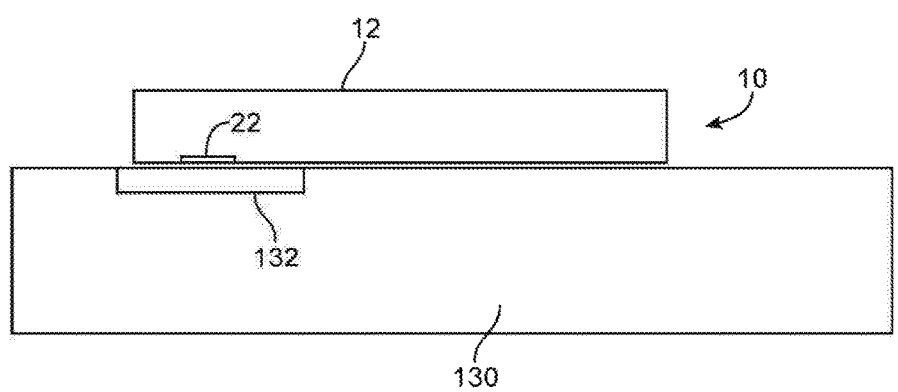
FIG. 16 is a side view of an illustrative electronic device and associated external equipment showing how the device may be oriented with respect to the external equipment during near field communications in accordance with an embodiment of the present invention.

FIG. 16 shows how device 10 may be held in place (e.g., manually by a user or using support structures) so that structures 22 face structures 132 in external equipment 130. With a configuration of the type shown in FIG. 16, external equipment 130 may be a peer device (e.g., another device such as device 10), may be external equipment such as a point of sale terminal, may be part of a computer, may part of an embedded system in an automobile, may be audio or video equipment, or may be any other suitable external device.

Structures 22 may include patterned conductive structures. For example, structures 22 may have an array of rows and columns of electrodes. There may be tens or hundreds of individual electrodes (e.g., in a fingerprint sensor) or there may be fewer electrodes (e.g., in a touch-based button or touch sensor). In configurations with numerous individual electrodes, clusters of electrodes (e.g., sub-arrays including multiple rows and multiple columns of electrodes) may be electrically coupled together during near field communications operations (e.g., to form one or more larger electrodes each of which is made up of a number of smaller electrodes that have been shorted together).

Figure 17:
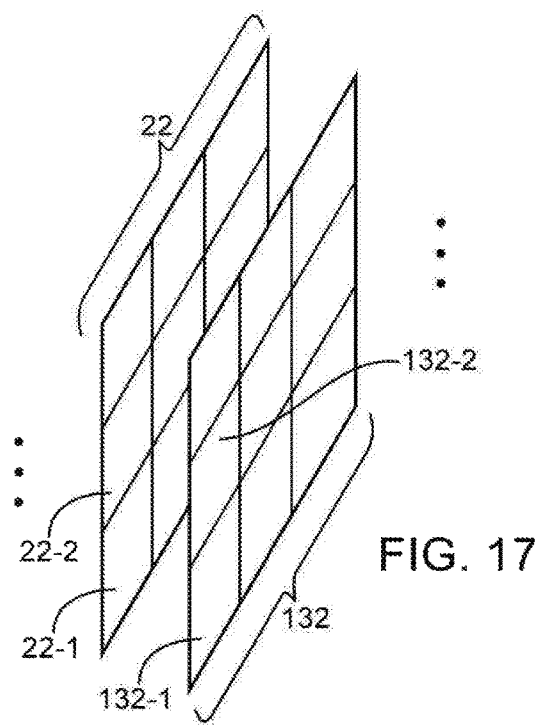
FIG. 17 is a perspective view of sensor electrode structures and corresponding capacitively coupled structures in external equipment showing how the device and external equipment may use multiple pairs of structures in parallel to support capacitively coupled near field communications in accordance with an embodiment of the present invention.

When multiple electrodes are available in structures 22 (e.g., when multiple clusters of smaller electrodes and/or multiple individual electrodes are available), electrodes may be used in parallel to support capacitively coupled near field communications (e.g., to enhance throughput and/or reliability). This type of scheme is illustrated in FIG. 17. As shown in FIG. 17, structures 22 may include multiple electrodes such as electrodes 22-1 and 22-2. When aligned with corresponding capacitor electrodes in near field communications structures 132 such as electrodes 132-1 and 132-2, structures 22 and 132 may be used to support parallel near field communications (e.g., with one data stream being conveyed between electrodes 22-1 and 132-1, with one data stream being conveyed between electrodes 22-2 and 132-2, etc.). Any suitable number of electrodes in structures 22 may be used in performing parallel near field communications in this way (e.g., two or more, three or more, four or more, five or more, ten or more, etc.). Switching circuitry 42 (FIG. 11) may be used in selecting which electrodes in structures 22 should be used in real time (e.g., based on signal strength measurements or other suitable control schemes).

Figure 18:
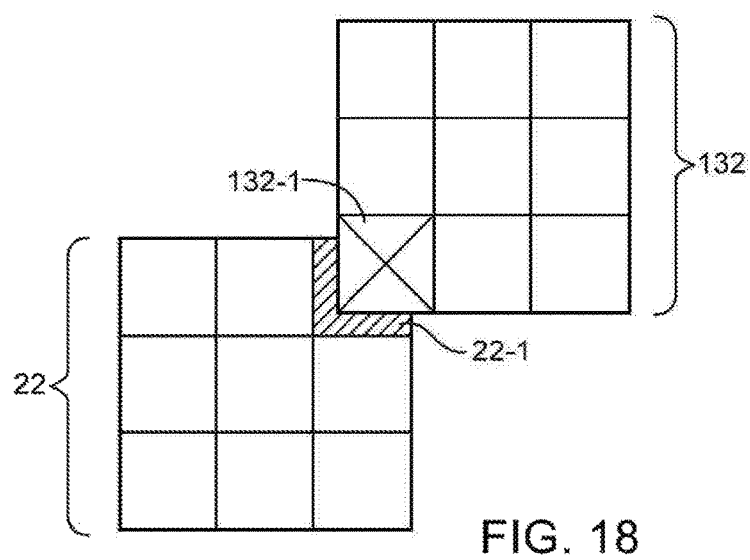
FIG. 18 is a top view of overlapping conductive electrode structures on a device and external equipment that may be used in capacitively coupled near field communications in accordance with an embodiment of the present invention.

In some scenarios, a user may not align structure 22 sufficiently with structures 132 to support parallel communications using all available electrodes. In this type of situation, device 10 can automatically select a subset of electrodes for use in performing near field communications. FIG. 18 is a top view of structures 22 and structures 132 in a configuration in which only a subset of the available electrodes in structures 22 and 132 overlap (i.e., only electrodes 22-1 and 132-1). In this illustrative arrangement, only electrodes 22-1 and 132-1 participate in supporting near field communications. When more overlapping electrodes become available, switching circuitry 42 may be used to automatically switch additional electrodes into use.

Figure 19:
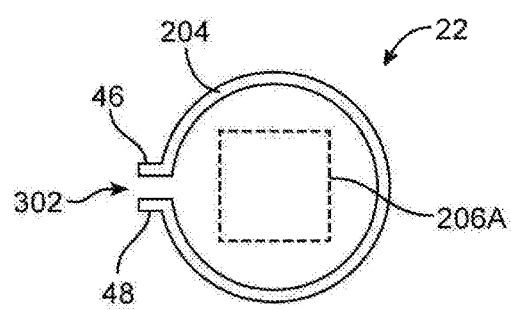
FIG. 19 is a top view of an illustrative sensor in an electronic device showing how sensor structures may be configured to form an inductor for performing inductively coupled near field communications with external equipment in accordance with an embodiment of the present invention.

As shown in FIG. 19, structures 22 may be configured to form inductive structures for use in inductively coupled near field communications. In the illustrative configuration of FIG. 19, structures 22 include an array of electrodes such as electrode array 206 (e.g., for a fingerprint sensor) and include a surrounding ring of conductive material such as ring 204 (e.g., a conductive ring such as metal ring 204 of FIG. 4). Ring 204 may be provided with a gap such as gap 302. Terminals such as terminals 46 and 48 may be formed on opposing sides of gap 302. With this type of configuration, electrode 204 may form an electrode in a fingerprint sensor and may also form a one-loop inductor for use in inductively coupled near field communications.

Figure 20:
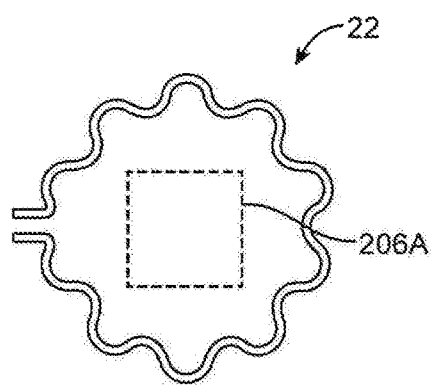
FIG. 20 is a top view of an illustrative sensor structure that has been configured to form an inductor with an undulating perimeter that may be used in performing inductively coupled near field communications with external equipment in accordance with an embodiment of the present invention.

FIG. 20 shows how loop-shaped electrode 204 may be provided with an undulating shape. The undulating shape of FIG. 20 may help enhance near field coupling performance.

Figure 21:
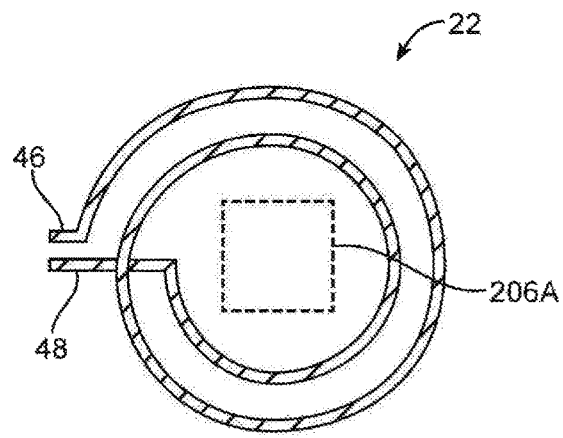
FIG. 21 is a top view of an illustrative sensor structure that has been configured to form an inductor with multiple loops that may be used in inductively coupled near field communications with external equipment in accordance with an embodiment of the present invention.

In the illustrative configuration of FIG. 21, electrode 204 has been provided with multiple turns, thereby increasing the inductance of structures 22 (i.e., inductor 204) for use in inductively coupled near field communications. In the examples of FIGS. 19, 20, and 21, structures 22 include an array of electrodes 206A (e.g., for a fingerprint sensor).

In general, any suitable conductive structures 22 (e.g., capacitive electrodes in a touch sensor, conductive structures associated with other electrical components, etc.) may be used in forming near field communications structures. The configurations of FIGS. 19, 20, and 21 are merely illustrative.

If desired, structures 22 may be used to form part of short range optical communications circuitry and optical components such as optical sensors. As an example, the optical transmitter and receiver structures that are used in an optical fingerprint sensor or other optical component may be used in forming optical transmitters and/or receivers that allow device 10 to wirelessly communicate with external equipment 130.

Figure 22:
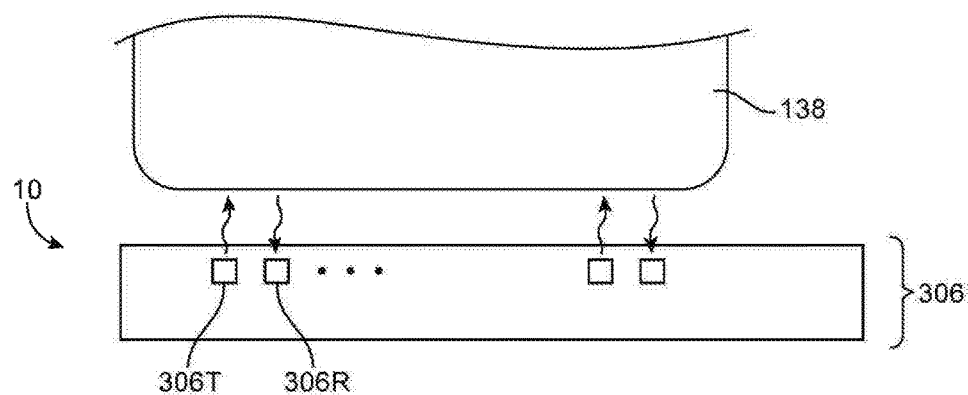
FIG. 22 is a cross-sectional side view of an illustrative optical sensor such as a fingerprint sensor being used to capture fingerprint data or otherwise sense an external object such as the finger or other body part of a user in accordance with an embodiment of the present invention.
Figure 23:
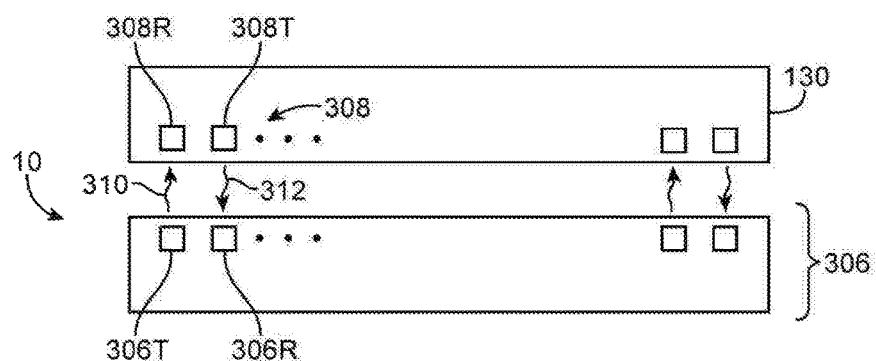
FIG. 23 is a cross-sectional side view of an illustrative optical sensor of the type shown in FIG. 22 being used to optically communicate with an external device in accordance with an embodiment of the present invention.

FIGS. 22 and 23 are cross-sectional side views of optical structures 304 of the type that may be used in both short-range optical communications and in sensing operations for device 10.

In the arrangement shown in FIG. 22, a user has placed an external object such as finger 138 in the vicinity of optical structures 306. Optical structures 306 may include optical transmitters such as transmitters 306T and optical receivers such as receivers 306R. Transmitters 306T may be, for example, infrared or visible light sources such as light-emitting diodes or lasers. Receivers 306R may be, for example, infrared or visible light receivers such as photodiodes or phototransistors. In the configuration of FIG. 22, structures 306 are being used as a fingerprint sensor. There may be, for example, an array having numerous rows and columns of transmitters and receivers. Each transmitter 306T may transmit light and each receiver 306R may measure that amount of transmitted light that is reflected from the surface of finger 138. Reflected light intensity is influenced by the pattern of surface features on finger 138, so the configuration of FIG. 22 may be used as an optical fingerprint sensor that captures a digital fingerprint from finger 138.

When it is desired to use structures 306 to support optical communications with external equipment 130, device 10 may be aligned with external equipment 130, as shown in FIG. 23. Device 10 may, as an example, be held in place by a user so that optical structures 306 align with corresponding optical structures 308 in external equipment 130. As shown in FIG. 23, optical structures 308 may include one or more optical transmitters 308T and one or more optical receivers 308R. When aligned as shown in FIG. 23, transmitters 306T can transmit light 310 that is received by receivers 308R and transmitters 308T may transmit light 312 that is received by receivers 306R. In configurations with only a single receiver/transmitter pair, structures 306 and 308 may support unidirectional communications. In configurations with multiple transmitters and receivers, structures 306 and 308 may support bidirectional communications. When structures 306 and 308 each contain multiple transmitters and receivers, multiple parallel data streams may be conveyed in parallel between device 10 and external equipment 130, thereby enhancing throughput and/or reliability.

Figure 24:
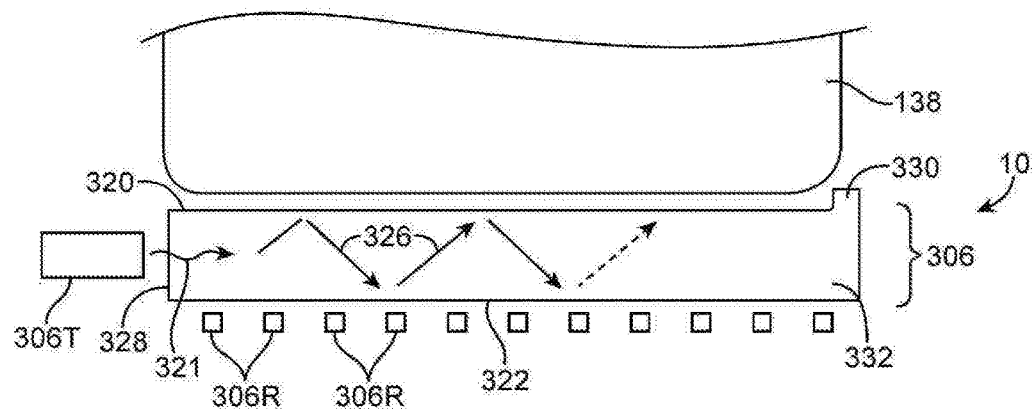
FIG. 24 is a cross-sectional side view of another illustrative optical sensor being used to capture fingerprint data or otherwise sense an external object such as the finger or other body part of a user in accordance with an embodiment of the present invention.
Figure 25:
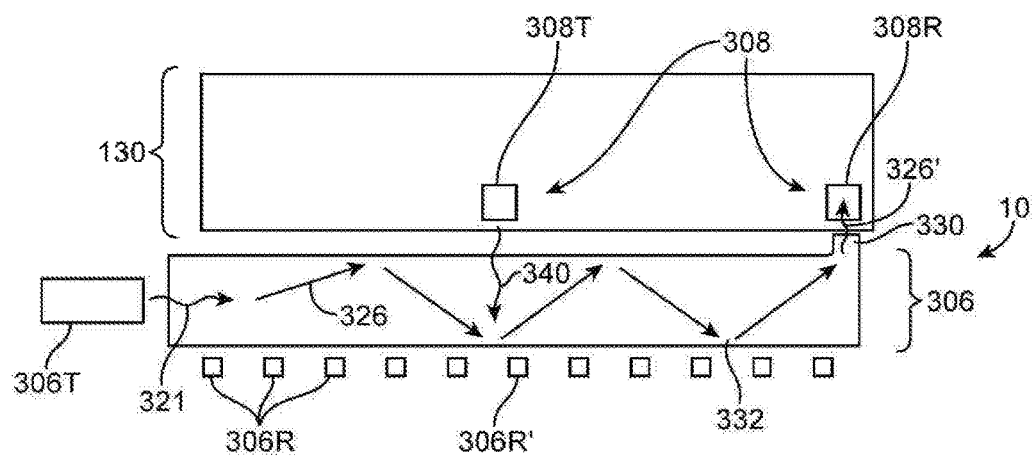
FIG. 25 is a cross-sectional side view of an illustrative optical sensor of the type shown in FIG. 23 being used to optically communicate with an external device in accordance with an embodiment of the present invention.

If desired, an optical sensor such as an optical fingerprint reader or touch sensor may have a configuration of the type shown in FIGS. 24 and 25. As shown in FIG. 24, optical structures 306 may include an optical source such as source 306T and an array of receivers 306R (e.g., a one-dimensional or two-dimensional array having tens, hundreds, or thousands of receivers 306R). Optical source 306T may be, for example, a light-emitting diode, a light-emitting diode array, one or more laser diodes, or other light source. Light source 306T may launch light 321 into edge 328 of light guide structure 332. Light 321 may be guided within light guide structure 332 by total internal reflection from upper surface 320 and lower surface 322, as illustrated by reflected light 326. Some of light 326 may escape vertically upwards to illuminate finger 138. Light detectors 306R may then measure the intensity of reflected light from finger 138 (e.g., to capture an optical fingerprint image).

Light guide structures 332 may be formed from a planar optically transparent member such as a sheet of plastic or glass or a transparent coating on a substrate. Structures 332 may have a portion such as portion 330 that helps direct light 326 upwards in a localized area.

As shown in FIG. 25, when it is desired to communicate optically between device 10 and external equipment 130, device 10 and external equipment may be placed sufficiently close to each other to align optical structures 308 in external equipment 130 and optical structures 306 in device 10. For example, portion 330 of light guide plate 332 may be aligned with receiver 308R of optical structures 308, so that portion 326' of light 326 from light source 306T can be detected by light receiver 308R. Optical structures 308 may include a light source such as light transmitter 308T for transmitting light 340 to one or more of receivers 306R such as receiver 306R' in optical structures 306 of device 10. When device 10 desires to optically transmit information to external equipment 130, control circuitry 28 can use transceiver circuitry (e.g., transceiver circuitry 24 of FIG. 2) to modulate the output of light source 306T, thereby transmitting data via light 326' to receiver 308R in external equipment 130. External equipment 130 may optically transmit information to device 10 by modulating the output of light source 308T, thereby transmitting data via light 340 that can be detected by receiver 306R'.

Optical structures such as structures 306 in device 10 may be formed as part of a button such as button 19, may be formed in regions such as regions 27 and 29 of FIG. 1, or may be formed elsewhere on housing 12. Optical structures such as structures 308 may be formed in an opening such as opening 300 of a cradle such as cradle 130 of FIGS. 13, 14, and 15, or may be formed elsewhere in external equipment 130. Optical structures 306 may include an array of receivers such as receivers 306R for capturing digital fingerprints or may include optical transmitter and receiver circuitry for performing other sensor functions (e.g., proximity sensing, ambient light sensing, etc.). The use of optical structures 306 to form an optical fingerprint sensor (in fingerprint sensor mode) and to form structures for supporting optical communications with nearby external equipment 130 (e.g., a cradle or other accessory, a peer device such as device 10, or other external equipment) is merely illustrative.

In configurations for device 10 in which sensor/NFC structures 22 are being used to support capacitive near field communications with external equipment 130, it may be challenging to properly align one or more of the electrodes in structures 22 with corresponding electrode structures in near field communications structures 132 of external equipment 130. For example, a user may find it difficult to hold button 19 and structures 22 on button 19 in precise alignment with corresponding structures 132 on equipment 130 (e.g., due to hand movement, etc.). There may also be an air gap between structures 22 and 132 that can cause electromagnetic fields to spread and weaken, potentially disrupting effective near field communications.

To ensure satisfactory performance under conditions such as these, structures 132 may be provided with enlarged dimensions relative to structures 22. If, as an example, there is one electrode in structures 22 such as ring-shaped electrode 204 of FIG. 26, structures 132 may be provided with a mating electrode such as electrode 132' that has larger lateral (X and Y) dimensions than the dimensions of electrode 204.

Figure 26:
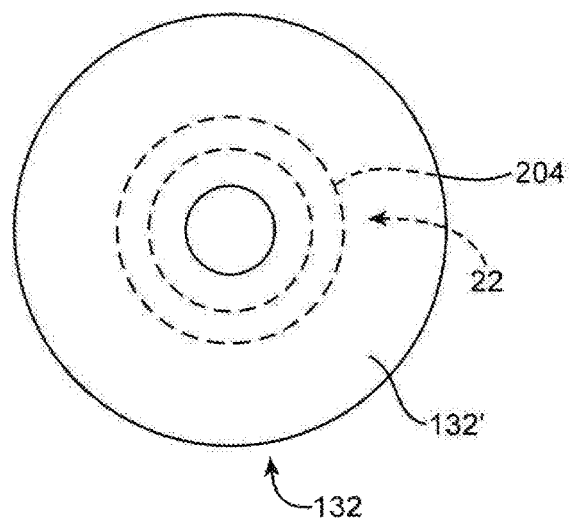
FIG. 26 is a top view of device structures and overlapping external equipment structures configured to communicate using near field communications in accordance with an embodiment of the present invention.
Figure 27:
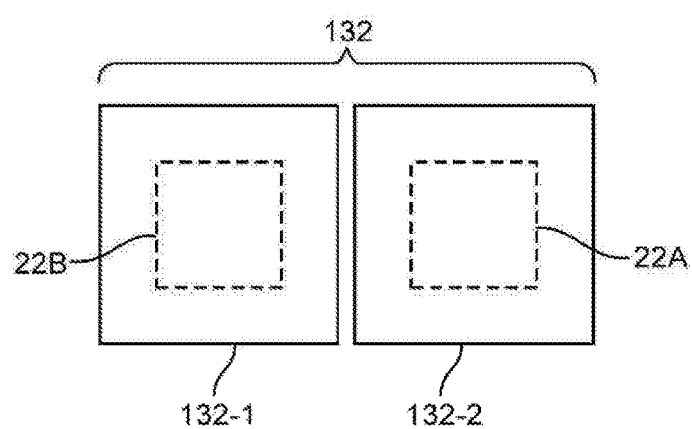
FIG. 27 is a top view of a pair of device electrodes and a corresponding pair of oversized external equipment electrodes that may be used for capacitive coupled near field communications in accordance with an embodiment of the present invention.

In the FIG. 26 example, electrode 204 of structures 22 has a ring shape and corresponding electrode 132' of structures 132 has a larger (wider) ring shape. In structures 22 with one or more electrodes with different shapes, structures 132 may be provided with one or more correspondingly enlarged electrodes with different shapes. If, for example, structures 22 include two rectangular electrodes that are used to support capacitively coupled near field communications such as electrodes 22A and 22B of FIG. 27, structures 132 may be provided with two corresponding rectangular electrodes such as electrodes 132-1 and 132-2. Electrodes 132-1 and 132-2 may be larger in area than electrodes 22A and 22B to enhance capacitive coupling.

The larger areas of the electrode(s) in structures 132 relative to the electrode(s) in structures 22 may therefore help ensure satisfactory near field communications performance, even when structures 22 and 132 are somewhat misaligned. The larger size of the enlarged electrodes (e.g., the receiving electrodes) relative to the other electrodes (e.g., the transmitting electrodes) may help account for a wider and weaker electromagnetic field distribution from the transmit electrode while maintaining separation between parallel channels in scenarios in which multiple data streams are being transmitted in parallel using multiple pairs of mating transmitting and receiving electrodes.

Device 10 and/or external equipment 130 may, if desired, adjust which electrodes are being used to handle capacitively coupled near field communications signals in real time. If, for example, a receiving electrode array in external equipment 130 or device 10 detects cross-talk between channels, the receiving electrode array can be reconfigured (e.g., to drop certain electrodes and to switch new electrodes into use in place of the dropped electrodes, to reconfigure the size and shape of electrodes that are formed from groups of conductive elements such as pixels in a fingerprint sensor array, etc.).

Figure 28:
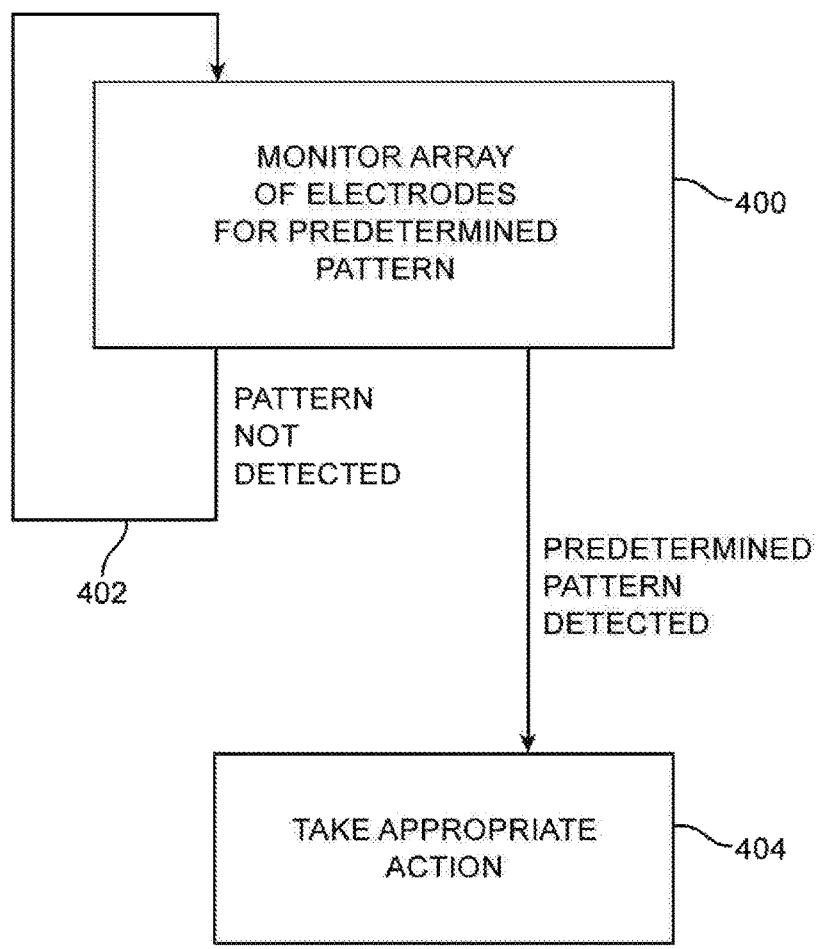
FIG. 28 is a flow chart of illustrative steps involved in using a predetermined near field communications signal pattern on an array of electrodes to trigger actions in accordance with an embodiment of the present invention.

The pattern of signals that is transmitted by a set of near field communications electrodes can be used as a virtual fingerprint that, once recognized, can initiate actions by device 10 and/or external equipment 130. Illustrative steps involved in using near field communications structures such as structures 22 of device 10 or structures 132 of external equipment to activate suitable actions in this way are shown in the flow chart of FIG. 28.

At step 28, a near field transmitter may transmit a pattern (i.e., a spatial pattern) of near field communications signals using multiple electrodes. The pattern of transmitted signals may be, for example, a pattern of capacitively coupled signals that is being transmitted by transmitter 24 in device 10 using structures 22 or may be a pattern of capacitively coupled signals that are transmitted by transmitter 134 in external equipment 130 using structures 132. A corresponding electrode array may be used in receiving and processing the transmitted signals.

The electrode structures that are being used to transmit the signals may include multiple electrodes. For example, the electrode structures may include a two dimensional array of electrodes or may include electrodes arranged in other patterns. During the operations of step 28, the near field communications transmitter may transmit signals using a predetermined pattern of the electrodes in the array. As an example, the near field communications transmitter may transmit signals using the first, fifth, and eight electrodes in a nine electrode (3×3) array (while the remaining electrodes are inactive). As another example, the near field communications transmitter may transmit signals using a checkerboard pattern of electrodes.

The particular subset of electrodes that is used to transmit signals from the electrode array may serve as a characteristic (virtual) "fingerprint" (i.e., an identifier). At step 404, the receiving near field communications transceiver may monitor its electrode array for incoming signals. In particular the near field communications receiver may monitor the pattern of signals that is being received by its electrode array to determine whether or not a particular identifier is being transmitted. Control circuitry in the receiving device may analyze received signals and can compare the received pattern of signals to known patterns. If there is no match between the incoming pattern of near field communications signals and the predetermined pattern or patterns of signals that are maintained by the receiver, the receiving device can continue to monitor its near field communications array for additional incoming signal patterns, as indicated by line 402.

In response to detection of a match between the measured signal pattern on the near field communications electrode array and a predetermined pattern, appropriate action may be taken using the control circuitry of the receiving device (step 404). If there is one predetermined pattern being used, a predetermined action can be taken upon receive of the predetermined pattern. If there are multiple predetermined patterns, the action that is taken may be selected based on the detected pattern.

Examples of actions that can be taken in response to detecting a predetermined electrode pattern "fingerprint" include activating a data transfer mode between device 10 and equipment 130, performing operations associated with authenticating a particular user to a system (e.g., performing a user logon to a system, verifying the identify of a user, using the pattern to retrieve a username or other information associated with a user), launching a particular application, presenting a user with a particular option in connection with a point-of-sale purchase or other transaction, etc.

The foregoing is merely illustrative of the principles of this invention and various modifications can be made by those skilled in the art without departing from the scope and spirit of the invention.

What is claimed is:

1. An electronic device, comprising:
    an array of conductive structures and an inductor that surrounds the array of conductive structures;
    sensor circuitry that is coupled to the array of conductive structures and the inductor and that is configured to gather sensor data using the array of conductive structures and the inductor; and near field communications circuitry that is coupled to the inductor and that is configured to receive near field communications signals with the inductor, wherein signals are provided to an external object from the sensor circuitry through the inductor, wherein the signals are coupled from the external object to the array of conductive structures, wherein the array of conductive structures provides the signals to the sensor circuitry; and
    near field communications circuitry that is coupled to the inductor and that is configured to receive near field communications signals with the inductor, wherein the near field communications circuitry comprises a near field communications transceiver that is coupled to the inductor and configured to transmit and receive rear field communications signals with the inductor.

2. The electronic device defined in claim 1 wherein the electronic device is operable by a user having a finger, and wherein the external object comprises the finger.

3. The electronic device defined in claim 2 wherein the inductor comprises a ring-shaped inductor.

4. The electronic device defined in claim 3 further comprising a button, wherein the inductor is mounted to the button.

5. The electronic device defined in claim 1 wherein the conductive structures comprise at least one sensor electrode.

6. The electronic device defined in claim 5 wherein the near field communications signals are inductively coupled.

7. The electronic device defined in claim 5, further comprising:
    a plurality of additional inductors, wherein the near field communications circuitry comprises near field communications circuitry that is configured to transmit multiple streams of data in parallel through the plurality of inductors using inductively coupled near field communications signals.

8. The electronic device defined device in claim 5 wherein the sensor electrode comprises at least one capacitor electrode.

9. The electronic device defined in claim 8 wherein the sensor circuitry is configured to gather capacitively coupled sensor data using the capacitor electrode.

10. The electronic device defined in claim 1 further comprising a button, wherein the conductive structures are mounted to the button.

11. The electronic device defined in claim 10 wherein the conductive structures are configured to form at least one capacitor electrode on the button and wherein the sensor circuitry is coupled to the capacitor electrode and is configured to gather sensor data using the capacitor electrode.

12. The electronic device defined in claim 10 wherein the inductor is formed on the button.

13. The electronic device defined in claim 1 further comprising switching circuitry that is configured to selectively couple the sensor circuitry and the near field communications circuitry to the inductor.

14. The electronic device defined in claim 1, wherein the inductor comprises a single conductive structure that is used by both the sensor circuitry to gather the sensor data and by the near field communications circuitry to receive the near field communications signals.

15. An electronic device, comprising:
    sensor circuitry;
    an array of conductive structures and at least one electrode, wherein the array of conductive structures and the electrode are coupled to the sensor circuitry, wherein the sensor circuitry is configured to gather sensor data using the electrode, wherein signals are provided to an external object from the sensor circuitry through the electrode, wherein the signals are coupled from the external object to the array of conductive structures, and wherein the array of conductive structures provides the signals to the sensor circuitry; and
    near field communications transceiver circuitry that is coupled to the electrode and that is configured to transmit and receive near field communications signals with the electrode, wherein the electrode comprises a single conductor, wherein the sensor circuitry is configured to gather the sensor data and the near field communications transceiver circuitry is configured to transmit and receive the near field communications signals using the single conductor.

16. The electronic device defined in claim 15 wherein the electrode is configured to form a capacitor structure and wherein the near field communications transceiver circuitry is configured to transmit and receive capacitively coupled near field communications signals using the capacitor structure.

17. The electronic device defined in claim 16 further comprising a button, wherein the capacitor structure is mounted on the button.

18. The electronic device defined in claim 16 further comprising a housing having a front face with a display, wherein the capacitor structure is mounted on the front face.

19. The electronic device defined in claim 18 wherein the sensor circuitry comprises fingerprint sensor circuitry.

20. The electronic device defined in claim 15, wherein the single conductor is an inductor.

21. The electronic device defined in claim 20, wherein the near field communications transceiver circuitry is configured to transmit and receive inductively coupled near field communications signals using the inductor.

22. The electronic device defined in claim 21, wherein the sensor circuitry is configured to gather inductively coupled sensor data using the inductor.

23. The electronic device defined in claim 15, wherein the at least one electrode is one of a plurality of electrodes that are each coupled to the sensor circuitry and the near field communications circuitry, wherein the sensor circuitry is configured to gather the sensor data using each of the plurality of electrodes, and wherein the near field communications transceiver circuitry is configured to transmit and receive the near field communications signals using each of the plurality of electrodes.

24. The electronic device defined in claim 15,
wherein the single conductor surrounds the array of conductive structures, and wherein the sensor circuitry is configured to gather the sensor data using the array of conductive structures.

25. The electronic device defined in claim 15, further comprising switching circuitry that is configured to selectively couple the single conductor to the sensor circuitry and the near field communications transceiver circuitry.

26. The electronic device defined in claim 15, wherein the sensor circuitry and the near field communications circuitry simultaneously use the single conductor for gathering sensor data and for near field communications.

27. The electronic device defined in claim 26, further comprising coupler circuitry coupled to the sensor circuitry and the near field communications circuitry, wherein the coupler circuitry routes the sensor data and the near field communications signals between the single conductor and the sensor circuitry and between the single conductor and the near field communications circuitry.

28. An electronic device, comprising:
an array of conductive structures and an inductor;
sensor circuitry coupled to the inductor and the array of conductive structures, wherein the sensor circuitry is configured to gather sensor data using the inductor, wherein signals are provided to an external object from the sensor circuitry through the inductor, wherein the signals are coupled from the external object to the array of conductive structures, and wherein the array of conductive structures provides the signals to the sensor circuitry; and
near field communications transceiver circuitry that is coupled to the inductor and that is configured to transmit and receive near field communications signals with the inductor.

29. The electronic device defined in claim 28 wherein the near field communications transceiver circuitry is configured to transmit and receive inductively coupled near field communications signals using the inductor.

30. The electronic device defined in claim 28,
wherein the sensor circuitry is configured to gather the sensor data with both the inductor and the array of conductive structures.

\* \* \* \* \*